United States Patent [19]
Abbott

[11] Patent Number: 5,982,707
[45] Date of Patent: Nov. 9, 1999

[54] METHOD AND APPARATUS FOR DETERMINING GEOLOGIC RELATIONSHIPS FOR INTERSECTING FAULTS

[75] Inventor: William E. Abbott, St. Austin, Tex.

[73] Assignee: GeoQuest, Houston, Tex.

[21] Appl. No.: 08/823,107

[22] Filed: Mar. 24, 1997

Related U.S. Application Data

[60] Provisional application No. 60/035,532, Jan. 16, 1997.

[51] Int. Cl.[6] ........................................................... G01V 1/30
[52] U.S. Cl. ................................. 367/53; 367/53; 367/72; 367/73; 367/38; 367/50; 367/5; 364/421
[58] Field of Search .................................. 367/53, 72, 73, 367/38, 50, 51; 364/421

[56] References Cited

U.S. PATENT DOCUMENTS

| | | | |
|---|---|---|---|
| 5,056,066 | 10/1991 | Howard | 367/72 |
| 5,189,643 | 2/1993 | Wang et al. | 367/38 |
| 5,432,751 | 7/1995 | Hildebrand . | |
| 5,537,320 | 7/1996 | Simpson et al. | 364/421 |
| 5,537,365 | 7/1996 | Sitoh | 367/73 |
| 5,661,698 | 8/1997 | Cacas | 367/73 |

*Primary Examiner*—John Barlow
*Assistant Examiner*—Anthony Jolly
*Attorney, Agent, or Firm*—John H Bouchard

[57] ABSTRACT

A novel fault framework method and apparatus automatically computes the relationships between intersecting fault surfaces. When faults are loaded into the novel fault framework apparatus, all intersecting fault pairs are determined and the fault fault intersection lines are computed and stored. The intersecting fault pairs are presented and available for automatic calculation of the major/minor and above/below fault pair relationships. The geometry of both intersecting fault surfaces are examined on either side of the fault fault intersection line. This, in combination with the relative size of the faults, is analyzed to compute the major/minor and above/below relationships based on geologic assumptions and knowledge of the origin of the fault surface data. When the relationships between intersecting faults is defined, the minor fault is appropriately truncated.

33 Claims, 11 Drawing Sheets

METHOD AND APPARATUS FOR DETERMINING GEOLOGIC RELATIONSHIPS FOR INTERSECTING FAULTS

CROSS REFERENCE TO RELATED APPLICATIONS

This specification was filed under 35 USC 119(e)(1) within one year following the filing of a corresponding Provisional Application serial No. 60/035,532, filed Jan. 16, 1997, and entitled "Method and Apparatus for Determining Geologic Relationships For Intersecting Faults".

BACKGROUND OF THE INVENTION

The subject matter of the present invention relates to a computer workstation and stored software based method and apparatus for use in the energy industry, which is responsive to a plurality of seismic data obtained during a seismic operation performed in connection with a fault ridden earth formation, for determining a geologic relationship between a pair of intersecting faults, and, more particularly, for determining whether a pair of faults of a multitude of fault pairs in the seismic data "relate" (i.e.—intersect), and, if the pairs do relate, which fault of the pair is the major fault and which fault of the pair is the minor fault, and, once the major and minor faults of the pair of faults is determined, whether the minor fault intersects the major fault from above or below the major fault and therefore whether the minor fault is truncated below or above, respectively, the major fault.

In order to correctly build a sub-surface structural model which incorporates fault surfaces, it is necessary to first establish the relationships between intersecting fault surfaces. These fault surfaces can then be gathered into a fault framework. The intersection of each pair of faults is represented as a line in 3D space (the fault-fault intersection line). For each intersecting pair of fault surfaces, one is typically classified as the major fault in that pair, and the other is classified as the minor fault in that pair. Based on this classification, the minor fault surface is truncated against the major fault surface in some way. If the minor fault intersects the major fault from above (i.e., it is structurally higher than the major fault), then it will be truncated at every point which is structurally below the line which forms the fault fault intersection. In this case, we say "the minor fault is truncated below the major fault". However, if the minor fault intersects the major fault from below (i.e., it is structurally lower than the major fault), then it will be truncated at every point above the line which forms the fault fault intersection. In this case, we say "the minor fault is truncated above the major fault". Establishing the major/minor, above/below relationships for intersecting faults is important for to building a representative fault framework.

These fault fault relationships can be determined by a "one by one" examination of the fault surfaces within their geologic context. This process can be extremely time consuming when done manually especially in an area with very complex fault geometries. It requires: (1) determining which faults intersect, and then for each intersecting fault pair located, (2) determining the fault fault intersection line, (3) determining which fault is the major fault, (4) determining how the minor fault should be truncated against the major fault, and (5) removing the portion of the minor fault surface which should be truncated.

Conventional fault frameworks established fault relationships based on a "fault tree" structure. This requires establishing an absolute hierarchy starting with a single fault and adding faults as branches from this basic structure. This has required manual intervention in defining the fault tree hierarchy. It is also necessary to rebuild the entire hierarchy when removing or adding a single branch to the hierarchy. Again, this manual process for building a fault framework can be extremely time consuming.

Accordingly, there is a need for a novel apparatus which would automatically determine whether a pair of faults relate (i.e., intersect) and determine the relationships between the intersecting fault surfaces. Using this novel apparatus, all intersecting fault pairs could be determined automatically, and the fault fault intersection lines for each fault pair could be automatically computed and stored. In addition, this novel apparatus could automatically calculate the major/minor and above/below fault pair relationships. Once these relationships are automatically determined, the minor fault could be automatically truncated above or below the major fault in the proper manner.

SUMMARY OF THE INVENTION

Accordingly, it is a primary object of the present invention to provide a novel fault framework method and apparatus which automatically identifies all intersecting fault pairs of a multitude of faults included in a set of seismic data which was obtained during a seismic operation of a fault ridden earth formation.

It is a further object of the present invention to provide a novel fault framework method and apparatus which automatically identifies all intersecting fault pairs of a multitude of faults included in a set of seismic data obtained during a seismic operation of a fault ridden earth formation and determines the relationships between the intersecting fault surfaces.

It is a further object of the present invention to provide a novel fault framework method and apparatus which automatically determines whether a pair of faults of the multitude of faults intersect, identifies the fault fault intersection line for each intersecting fault pair, identifies the major/minor and above/below fault pair relationships for each intersecting fault pair, and determines whether the minor fault of the intersecting fault pair truncates above or below the major fault.

It is a further object of the present invention to provide a novel fault framework method and apparatus, which is responsive to seismic data containing information representative of a multitude of faults in an earth formation, for:

(a) determining if each pair of faults in the multitude of faults relate (i.e., intersect), and, if a particular pair of faults relate and intersect, (b) determining which fault of the pair of faults is the major fault and which fault of the pair of faults is the minor fault, and, when the major fault and the minor fault of the particular pair of faults is determined, (c) determining if the minor fault intersects the major fault from above (or below) the major fault, and, if the minor fault intersects the major fault from above (or below), (d) determining that the minor fault is truncated below (or above) the major fault.

In accordance with these and other objects of the present invention, a novel computer workstation based method and apparatus, for automatically computing the relationships between intersecting faults, has been developed. The novel apparatus, in accordance with this invention, includes a computer workstation, and a novel software package, entitled "Establish Geologic Consistancy Between Intersecting Faults", adapted to be stored in a memory of the workstation. A seismic operation is performed in connection with a fault ridden earth formation, and a set of seismic data is obtained in response to the seismic operation. The set of seismic data includes information indicative of a multitude of faults in the earth formation. The seismic data is input to the computer workstation. A CD-Rom is inserted into the workstation, and the "Establish Geologic Consistancy" software is loaded into the workstation. When the processor of the workstation executes the novel "Establish Geologic Consistancy" software package in response to the seismic data, all intersecting fault pairs in the set of seismic data are automatically identified, and a fault-fault intersection line for each intersecting fault pair in the seismic data is automatically computed and stored. The intersecting fault pairs are presented and available for automatic calculation, by the workstation processor, of the "major/minor" and "above/below" relationships. The geometry of both intersecting fault surfaces, on either side of the fault fault intersection line, is examined. In addition, the relative size of the faults is also examined. As a result, the geometry of both intersecting fault surfaces and the relative size of the faults are both used to compute the "major/minor" and "above/below" relationships, based on geologic assumptions and a knowledge of the origins of the fault surface data. The novel "Establish Geologic Consistancy" software package of this invention also includes a reliability component and it returns an undefined answer when the fault geometries prevent a reasonable chance of an accurate computation. Once the relationship between two intersecting faults is defined, the minor fault is truncated appropriately.

More particularly, when a processor of the computer workstation executes the novel "Establish Geologic Consistancy" software of the present invention that is stored in the workstation memory, the workstation processor will: (a) receive a multitude of input data (which is stored in a "Reduced Data Output Record Medium" and includes "information relating to a multitude of faults in an earth formation"), and (b) perform the following operational steps on such input data: (b1) determine if each particular pair of faults in the input data "relate" (i.e., do the pair of faults intersect); (b2) determine which fault, of the pair of intersecting faults, is the "major" fault and which fault, of the pair of intersecting faults, is the "minor" fault; (b3) determine if the "minor" fault intersects the "major" fault from above or below the "major" fault; and (b4) determine that the "minor" fault is truncated below or above the "major" fault.

The fault framework of the present invention represents a significant improvement over any of the conventional fault frameworks since, with this invention, each fault-fault intersection is treated separately without the necessity of considering any other fault which might intersect one of the faults in question. This makes it easy, using the present invention, to manipulate the fault framework by adding and removing faults. In addition, the fault framework of this invention computes the relationships between the intersecting faults without the need for manual intervention in most cases.

Further scope of applicability of the present invention will become apparent from the detailed description presented hereinafter. It should be understood, however, that the detailed description and the specific examples, while representing a preferred embodiment of the present invention, are given by way of illustration only, since various changes and modifications within the spirit and scope of the invention will become obvious to one skilled in the art from a reading of the following detailed description.

BRIEF DESCRIPTION OF THE DRAWINGS

A full understanding of the present invention will be obtained from the detailed description of the preferred embodiment presented hereinbelow, and the accompanying drawings, which are given by way of illustration only and are not intended to be limitative of the present invention, and wherein:

FIGS. 17, 18a, 18a1, 18b, and 19 are used in connection with a discussion for determining whether two pair of faults "relate" or "intersect"

DESCRIPTION OF THE PREFERRED EMBODIMENT

Figure 1:
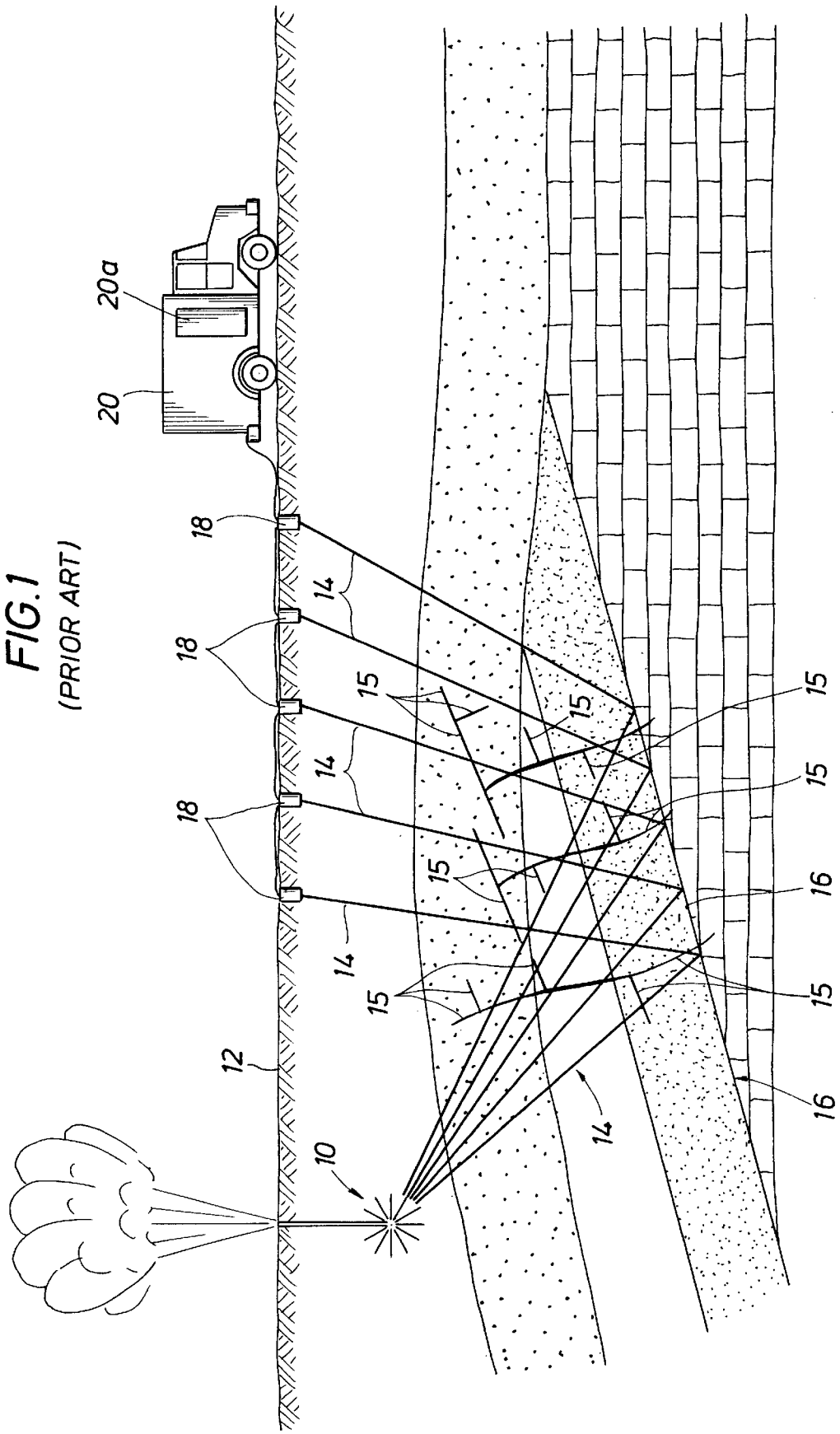
FIGS. 1 and 2 illustrate a seismic operation of a fault ridden earth formation.
Figure 2:
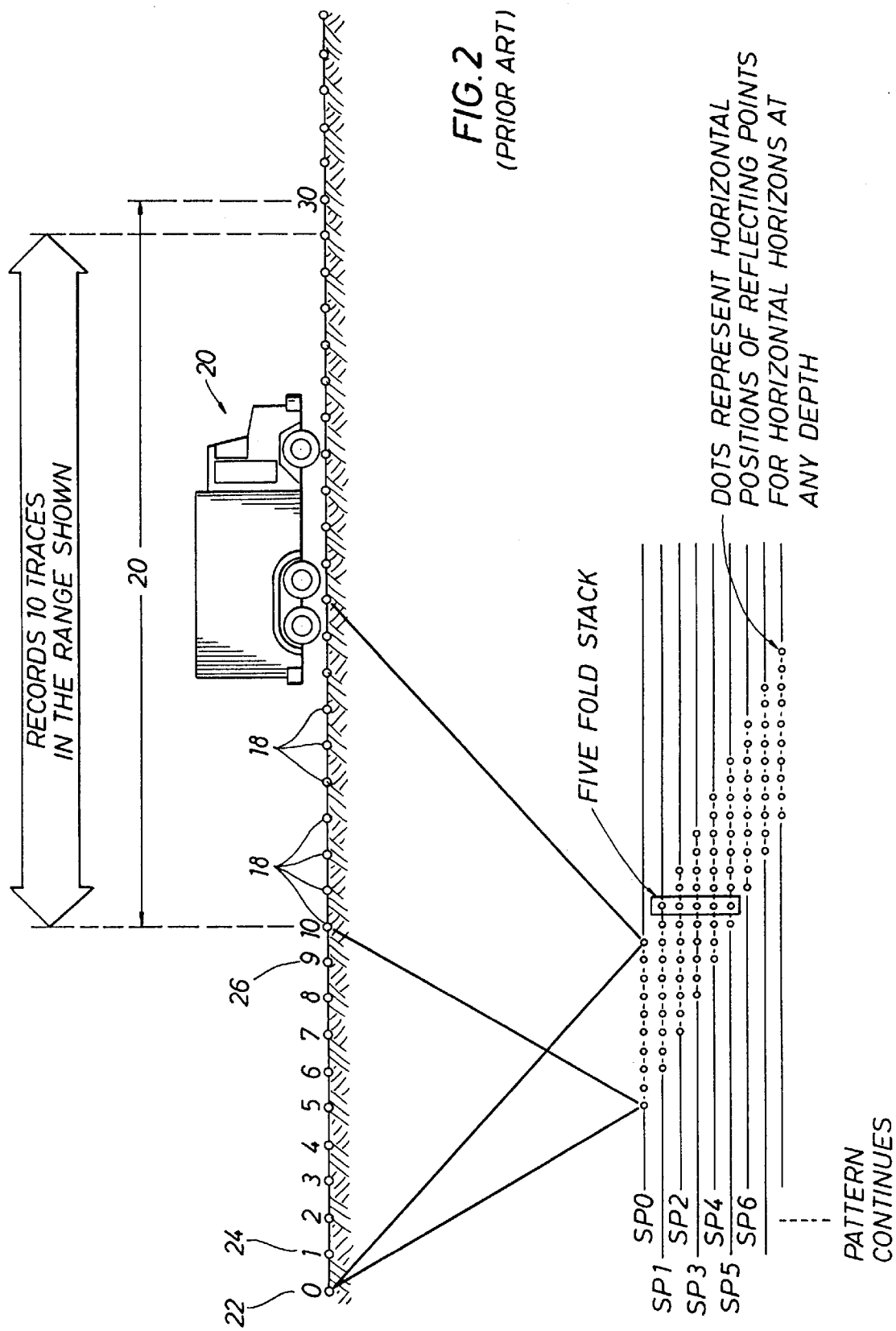

Referring to FIGS. 1 and 2, an apparatus and associated method for performing a three dimensional (3D) seismic operation at a location on the earth's surface is illustrated.

In FIG. 1, an explosive or acoustic energy source 10 situated below the surface of the earth 12 detonates and generates a plurality of sound or acoustic vibrations 14 which propagate downwardly and reflect off a horizon layer 16 within the earth formation. The horizon layer 16 could be a top layer of rock or sand or shale. The sound vibrations 14 also reflect off a multitude of faults 15 which exist within the earth formation. Some of the faults 15 intersect other faults 15 thereby forming a pair of intersecting faults, or "fault pairs". When the sound vibrations reflect off the horizon layer 16 and off the multitude of faults 15 in the earth formation, the sound vibrations 14 will propagate upwardly and will be received in a plurality of receivers 18 called geophones 18 situated at the surface of the earth. The plurality of geophones 18 will each generate an electrical signal in response to the receipt of a sound vibration therein and a plurality of electrical signals will be generated from the geophones 18, the plurality of signals being received in a recording truck 20.

The plurality of electrical signals from the geophones 18 represent a set of characteristics of the earth formation located within the earth below the geophones 18, and, in particular, represent the characteristics of the multitude of faults 15 which are located adjacent the horizon 16 in the earth.

The recording truck 20 contains a computer 20a which will receive and store the plurality of signals received from the geophones 18. An output record medium will be generated from the computer 20a in the recording truck 20 which will include and/or display and/or store the plurality of electrical signals that are representative of the multitude of faults 15 located adjacent the horizon 16 situated in the earth below the geophones 18.

The apparatus and method described above with reference to FIG. 1 is called a 2D (for two dimensional) seismic operation because the above referenced method referred to generating the sound vibrations 14 along the x-z axes. However, in reality, the sound vibrations 14 would be propagating along the x, y, and z axes. As a result, the apparatus and method described above with reference to FIG. 1 should more properly be called a "3D" seismic operation (since the sound vibrations 14 propagate along the x, y, and z axes in FIG. 1). The x-axis represents the horizontal distance, the y-axis represents the transverse distance, and the z-axis represents the reflection time.

Referrring to FIG. 2, another method and apparatus for performing a 3D seismic operation is illustrated. FIG. 2 was taken from a book entitled "Seismic Velocity Analysis and the Convolutional Model", by Enders A. Robinson, the disclosure of which is incorporated by reference into this specification.

In FIG. 2, the 3D seismic operation of FIG. 1 is performed 10 different times. For example, when the explosive energy source 10 is located at position 22 (the first position or position "0" along the surface of the earth) in FIG. 2, a first plurality of electrical signals from the geophones 18 are stored in the computer 20a in the recording truck 20. The explosive energy source is moved to position 24. When the explosive energy source 10 is located in position 24 (the second position or position "1" along the surface of the earth), a second plurality of electrical signals are stored in the computer 20a in the recording truck 20. The explosive energy source 10 is repeatedly and sequentially moved from positions "2" to "9" in FIG. 2 until it is located at position 26 (i.e.—position "9" which is the tenth position) on the surface of the earth. When the explosive energy source 10 is located in position 26 (the tenth position along the surface of the earth), a tenth plurality of electrical signals are stored in the computer 20a in the recording truck 20. As a result, in FIG. 2, the recording truck 20 records 10 traces (ten sets of electrical signals, where each set is a plurality of electrical signals) between position 22 and position 26 along the surface of the earth. An output record medium will be generated by the computer 20a in the recording truck 20 which includes the 10 traces or ten set of electrical signals received from the geophones 18.

Figure 3:
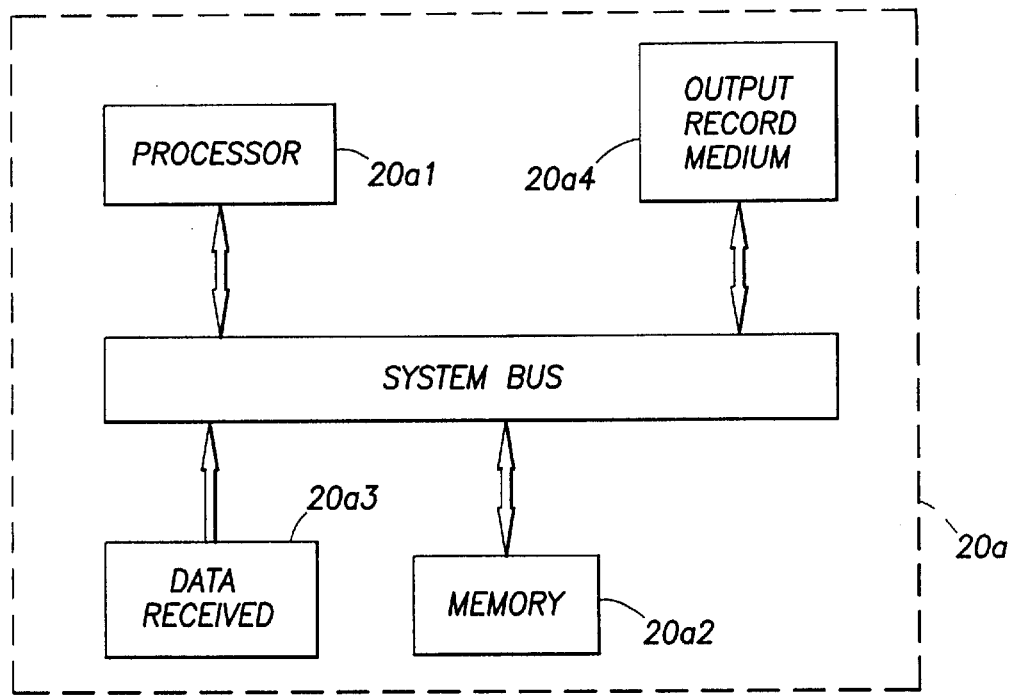
FIGS. 3 and 4 illustrate a recording truck computer for storing the seismic data from FIGS. 1 and 2 and a mainframe computer for data reducing the seismic data thereby generating a reduced data output record medium which contains information representative of a multitude of faults in the earth formation.

Referring to FIG. 3, a more detailed construction of the recording truck computer 20a is illustrated.

In FIG. 3, the recording truck computer 20a includes a processor 20a1 and a memory 20a2 connected to a system bus. The ten traces or ten sets of electrical signals (received from the geophones 18 of FIGS. 1 and 2 during the 3D seismic operation and including information representative of the multitude of faults 15 in the earth formation shown in FIG. 1) would be received into the recording truck computer 20a via the "Data received" block 20a3 in FIG. 3 and would be stored in the memory 20a2 of the recording truck computer 20a. When desired, an output record medium 20a4 is generated by the recording truck computer 20a, the output record medium 20a4 being adapted for storing and displaying "a plurality of seismic data" representing the ten traces or ten sets of electrical signals received by the recording truck computer 20a from the geophones 18, the plurality of seismic data including the information representative of the multitude of faults 15 in the earth formation of FIG. 1.

Figure 4:
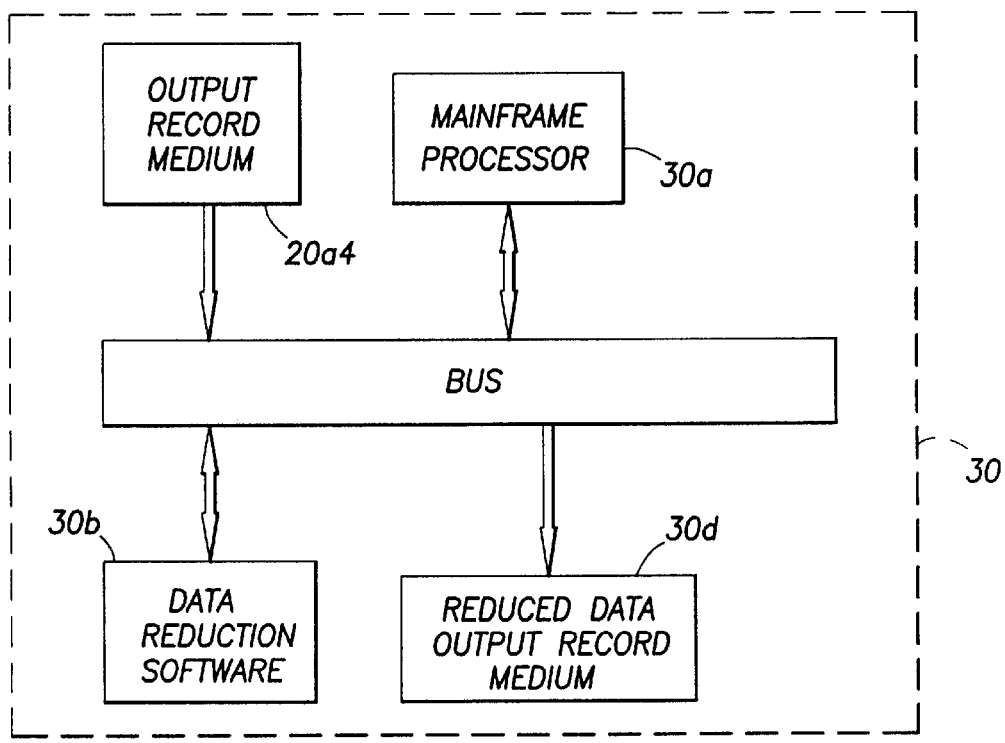

Referring to FIG. 4, a simplified diagram of a mainframe computer 30 is illustrated which uses a stored "data reduction software" to perform a "data reduction" operation on the "plurality of seismic data" included in the output record medium 20a4 of FIG. 3.

In FIG. 4, the mainframe computer 30 produces a "reduced data output record medium" 30d in FIG. 4 which is adapted for storing and displaying information that represents "reduced" versions of the "plurality of seismic data" included in the output record medium 20a4 of FIG. 3. The mainframe computer 30 of FIG. 4 includes a mainframe processor 30a connected to a system bus and a memory 30b also connected to the system bus which stores a "data reduction software" therein. The output record medium 20a4 of FIG. 3, which includes the "plurality of seismic data" representative of the multitude of faults 15 in the earth formation, is connected to the system bus of the mainframe computer 30 of FIG. 4. As a result, the "plurality of seismic data", included in the output record medium 20a4 of FIG. 3, is now being input to the mainframe processor 30a of FIG. 4. The processor 30a of the mainframe computer 30 in FIG. 4 executes the "data reduction software" stored in the memory 30b of the mainframe computer.

The "data reduction software", which is stored in the memory 30b of the mainframe computer 30 of FIG. 4, can be found in a book entitled "Seismic Velocity Analysis and the Convolutional Model", by Enders A. Robinson, the disclosure of which is incorporated by reference into this specification.

In FIG. 4, when the "data reduction software" in memory 30b is executed, the mainframe processor 30a will perform a "data reduction" operation on the "plurality of seismic data" that is included in the output record medium 20a4 of FIG. 3. When the "data reduction operation" is complete, the mainframe processor 30a will generate a "reduced data output record medium" 30d which will store and is adapted for displaying information: (1) representing a "reduced version" of the "plurality of seismic data" included in the output record medium 20a4 of FIG. 3, and (2) including a set of characteristics pertaining to the "multitude of faults" 15 in the earth formation of FIG. 1 (said information stored in the "reduced data output record medium" 30d being hereinafter called "data reduced versions of the plurality of seismic data"). The "data reduced versions of the plurality of seismic data" stored in the "reduced data output record medium" 30d of FIG. 4 represents spatially corrected subsurface images of the multitude of faults 15 within the earth formation of FIG. 1.

Figure 5:
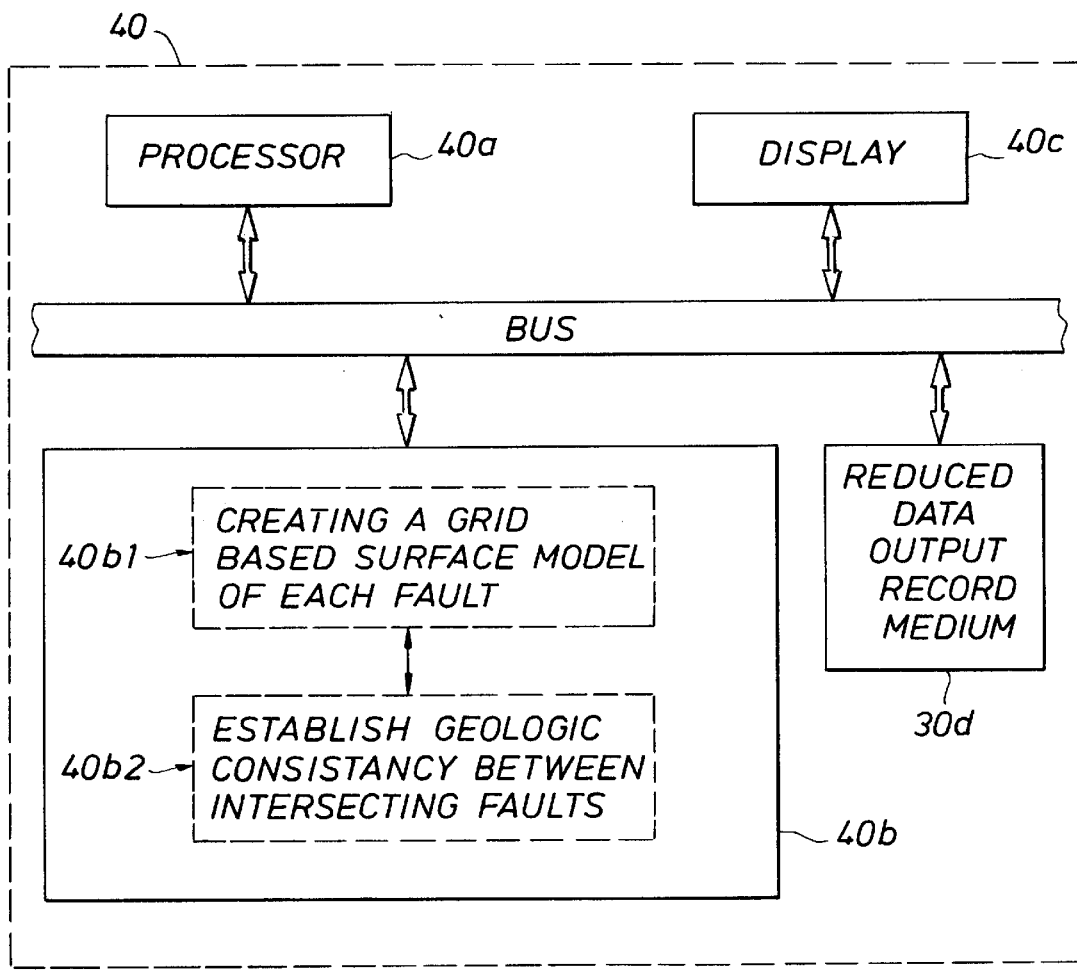
FIG. 5 illustrates a computer workstation which stores a novel software package, in accordance with the present invention, entitled "Establish Geologic Consistancy Between Intersecting Faults"

Referring to FIG. 5, an interpretation workstation 40 is illustrated which stores a novel software, in accordance with the present invention, entitled "Establish Geologic Consistancy Between Intersecting Faults".

Figures 6A, 6B:
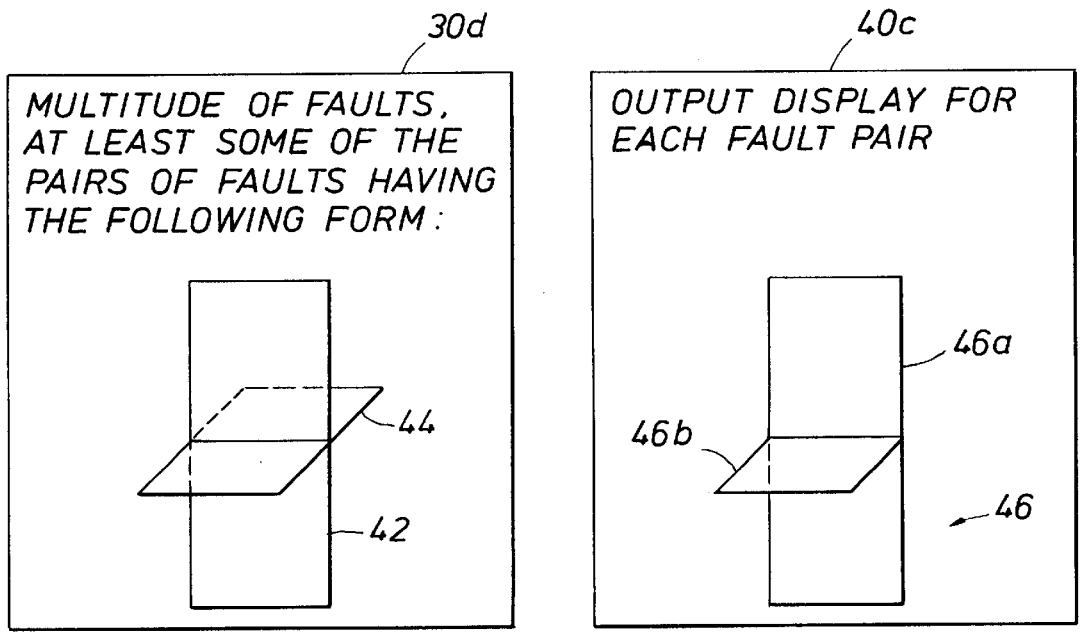
FIG. 6a illustrates a multitude of fault pairs input to the workstation of FIG. 5.
FIG. 6b illustrates an output display which is generated on the display screen of the computer workstation of FIG. 5 and which illustrates a fault pair, one of which is the major fault and the other of which is the minor fault, where the minor fault may be displayed as intersecting the major fault from below the major fault (although the minor fault could have intersected the major fault from above the major fault), and where the minor fault is displayed as being truncated above the major fault (although the minor fault could have been truncated below the major fault if the minor fault intersected the major fault from above the major fault)

In FIG. 5, the interpretation workstation 40 includes a system bus, a processor 40a connected to the system bus, a memory 40b connected to the system bus adapted for storing the "Establish Geologic Consistancy" software of the present invention, and a display 40c connected to the system bus for generating a "visual display" on a display screen for viewing by an operator sitting at the workstation 40 when the software in the memory 40b is executed by the workstation processor 40a. The "visual display", in accordance with the present invention, is illustrated in FIG. 6b and will be discussed in more detail below. The "reduced data output record medium" 30d of FIG. 4 is connected to the system bus of the workstation 40 and provides the "input data" for use by the workstation processor 40a. As illustrated in FIG. 6a, the reduced data output record medium 30d contains information relating to the multitude of faults 15 of FIG. 1.

The memory 40b of the workstation 40 of FIG. 5 is adapted to store at least two blocks of software:

(1) a first block of software 40b1 entitled "Creating a Grid Based Surface Model of Each Fault" (referred to as the "Creating a Grid Based Surface Model" software 40b1")— The Creating a Grid Based Surface Model software 40b1 will be discussed below with reference to FIG. 16 of the drawings; and (2) a second block of software 40b2, in accordance with the present invention, entitled "Establish Geologic Consistancy Between Intersecting Faults" (referred to as the "Establish Geologic Consistancy" software 40b2)—The Establish Geologic Consistancy software 40b2 is discussed below with reference to FIG. 7 of the drawings.

The "Creating a Grid Based Surface Model" software 40b1 and the "Establish Geologic Consistancy" software 40b2 are each initially stored on a storage disc called a "CD-Rom". The CD-Rom is inserted into the workstation 40 and the "Creating a Grid Based Surface Model" software 40b1 and the "Establish Geologic Consistancy" software 40b2 are each loaded into the memory 40b of the workstation 40.

The workstation 40 could comprise, for example, a Silicon Graphics Indigo2 workstation. The software programs 40b1 and 40b2, stored in the memory 40b of the workstation 40, can be written in C programming language under Unix and Motif standards. The programs 40b1,40b2 can be recomplied and run on Sun workstations in conjunction with other CPS-3 products listed below, which are available from Geoquest, a division of Schlumberger Technology Corporation, Houston, Texas. In addition to the Unix workstation operating environment, the minimum CPS-3 Mapping and Modeling software required to run the "Establish Geologic Consistancy" software 40b2 of the present invention is as follows (such CPS-3 Mapping and Modeling software being available from Geoquest, a division of Schlumberger Technology Corporation, Houston, Tex.): (1) CPS-3 Main Module runtime license; (2) SurfViz Visualization software; and (3) IESX Seis3DV, Part No. UA3D1-QD1

Referring to FIG. 6a, the content of the "Reduced Data Output Record Medium" 30d of FIG. 5, which provides the "input data" being input to the workstation 40 of FIG. 5, is illustrated.

In FIG. 6a, as previously indicated, the "Reduced Data Output Record Medium" 30d of FIG. 5 contains information relating to the multitude of faults 15 in the earth formation of FIG. 1. As illustrated in FIG. 6a, at least some of the pairs of faults 15, inherent in the information contained within the Reduced Data Output Record Medium 30d, intersect (i.e., they "relate") and have the following particular form: a first fault 42 intersects a second fault 44. However, other pairs of faults 15, inherent in the information contained within the "Reduced Data Output Record Medium" 30d, do not intersect (i.e., they do not "relate") and do not follow the above referenced particular form. However, the problem with the "information relating to the multitude of faults 15" of FIG. 6a that is stored within the "Reduced Data Output Record Medium" 30d of FIG. 5 is as follows:

(1) We do not know which pairs of faults, in the "information" contained within the "Reduced Data Output Record Medium" 30d of FIG. 5, "intersect" and therefore "relate" and which pairs of faults do not "intersect" and therefore do not "relate". At least some of the pairs of faults, inherent in the "information" contained within the "Reduced Data Output Record Medium" 30d, do "intersect" and do "relate". For example, the fault pair 42 and 44 of FIG. 6a do intersect and therefore do "relate";

(2) When the "intersecting" fault pairs 42, 44 of FIG. 6a, inherent in the "information" contained within the "Reduced Data Output Record Medium" 30d, are identified, we still do not know which fault of each intersecting fault pair 42, 44 in the "information" is the "major" fault and which fault of each intersecting fault pair 42, 44 is the "minor" fault; and (3) If the "minor" fault of each intersecting pair of faults 42, 44 is known, we still do not know if the minor fault intersects the major fault from above or below the major fault (since, if the minor fault intersects the major fault from below the major fault, the minor fault is truncated above the major fault, and if the minor fault intersects the major fault from above the major fault, the minor fault is truncated below the major fault).

Referring to FIG. 6b, a typical output display, in accordance with the present invention, which is displayed on the display screen 40c of the interpretation workstation 40 of FIG. 5, is illustrated.

In FIG. 6b, the display screen 40c of the workstation 40 of FIG. 5 will display, among other things, an intersecting fault pair 46 when the "Creating a Grid Based Surface Model" software 40b1 and the "Establish Geologic Consistancy" software 40b2 in the memory 40b is executed by the processor 40a of the workstation 40 of FIG. 5. In FIG. 6b, one of the faults of the pair 46 on the display screen 40c has been identified as the major fault 46a and the other of the faults of the pair 46 has been identified as the minor fault 46b. Furthermore, in FIG. 6b, the minor fault 46b is displayed on the display screen 40c as intersecting the major fault 46a from below the major fault 46a (although the minor fault 46b could have intersected the major fault 46a from above the major fault 46a), and the minor fault 46b is displayed on the display screen 40c as being truncated above the major fault 46a (although the minor fault 46b could have been truncated below the major fault 46a if the minor fault 46b intersected the major fault 46a from above the major fault 46a).

Figure 7:
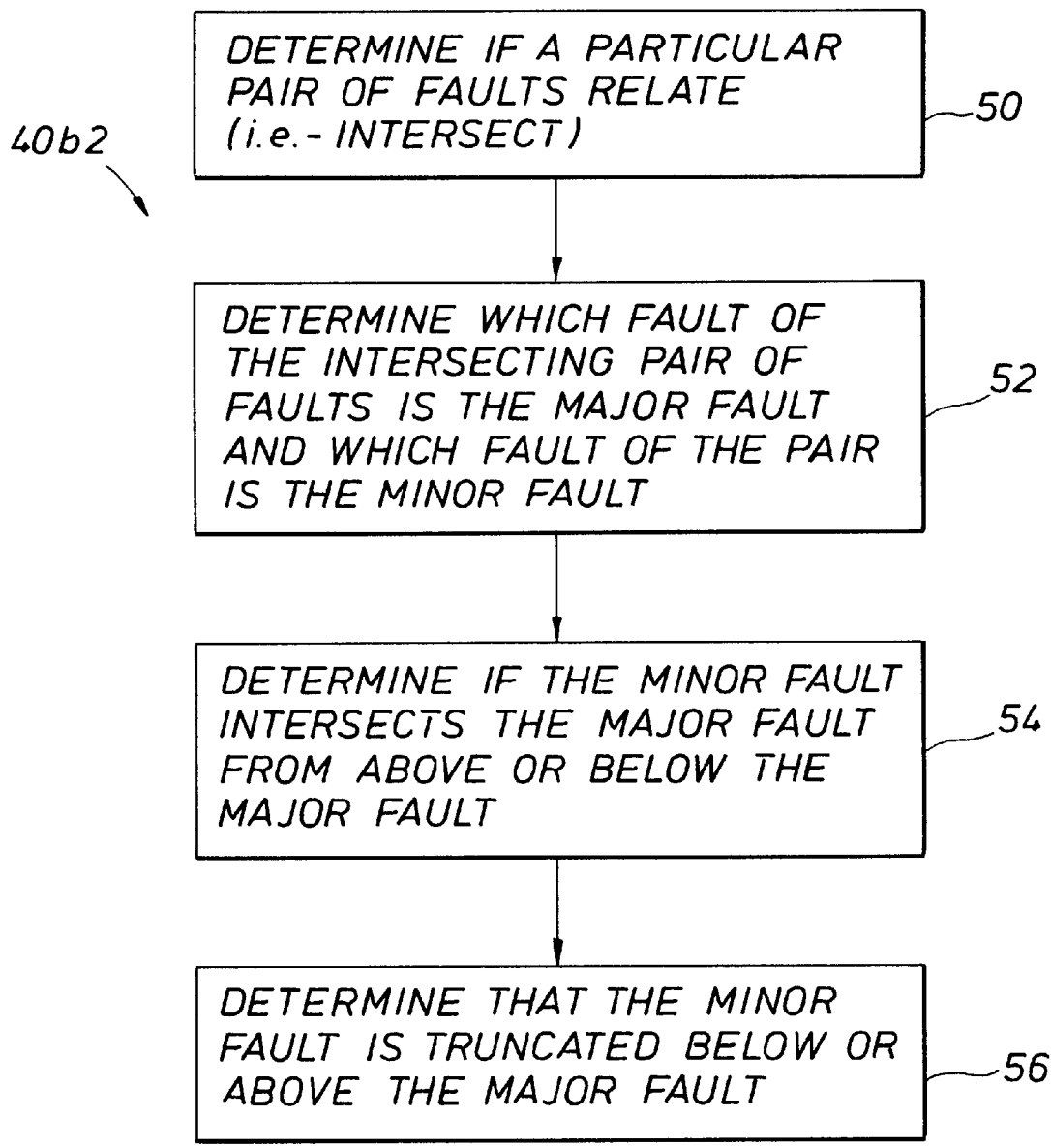
FIG. 7 illustrates the steps performed by the novel software algorithm of the present invention entitled "Establish Geologic Consistancy Between Intersecting Faults" stored in the workstation of FIG. 5.

Referring to FIG. 7, the steps performed by the novel software package of the present invention entitled "Establish Geologic Consistancy Between Intersecting Faults" 40b2, stored in the memory 40b of the interpretation workstation 40 of FIG. 5, are illustrated and discussed in detail below. The function performed by the "Creating a Grid Based Surface Model" software 40b1 will be discussed below with reference to FIG. 16 of the drawings.

In FIG. 7, when the processor 40a of the interpretation workstation 40 of FIG. 5 executes the "Establish Geologic Consistancy" software 40b2 of the present invention which is stored in the memory 40b of FIG. 5, the workstation 40 processor 40a will respond to the "information relating to the multitude of faults 15 in the earth formation", which is contained within the "Reduced Data Output Record Medium" 30d of FIG. 5, by performing the following functional steps, as indicated in FIG. 7:

1. Determine if a particular pair of faults Relate (i.e., do the pair of faults intersect)—block 50

2. Following step 1, determine which fault of the intersecting pair of faults is the major fault and which fault of the pair is the minor fault—block 52

3. Following step 2, determine if the minor fault intersects the major fault from above or below the major fault—block 54; and 4. Following step 3, determine that the minor fault is truncated below or above the major fault—block 56

Referring to FIGS. 8 through 21, when the processor 40a of the interpretation workstation 40 of FIG. 5 executes the "Creating a Grid Based Surface Model" software 40b1 and the "Establish Geologic consistancy" software 40b2 of FIGS. 5 and 7 of the present invention, the processor 40a of the workstation 40 will perform a certain functional operation. A detailed description of that functional operation is set forth below in the following paragraphs with reference to FIG. 8 through FIG. 21 of the drawings.

Figure 8:
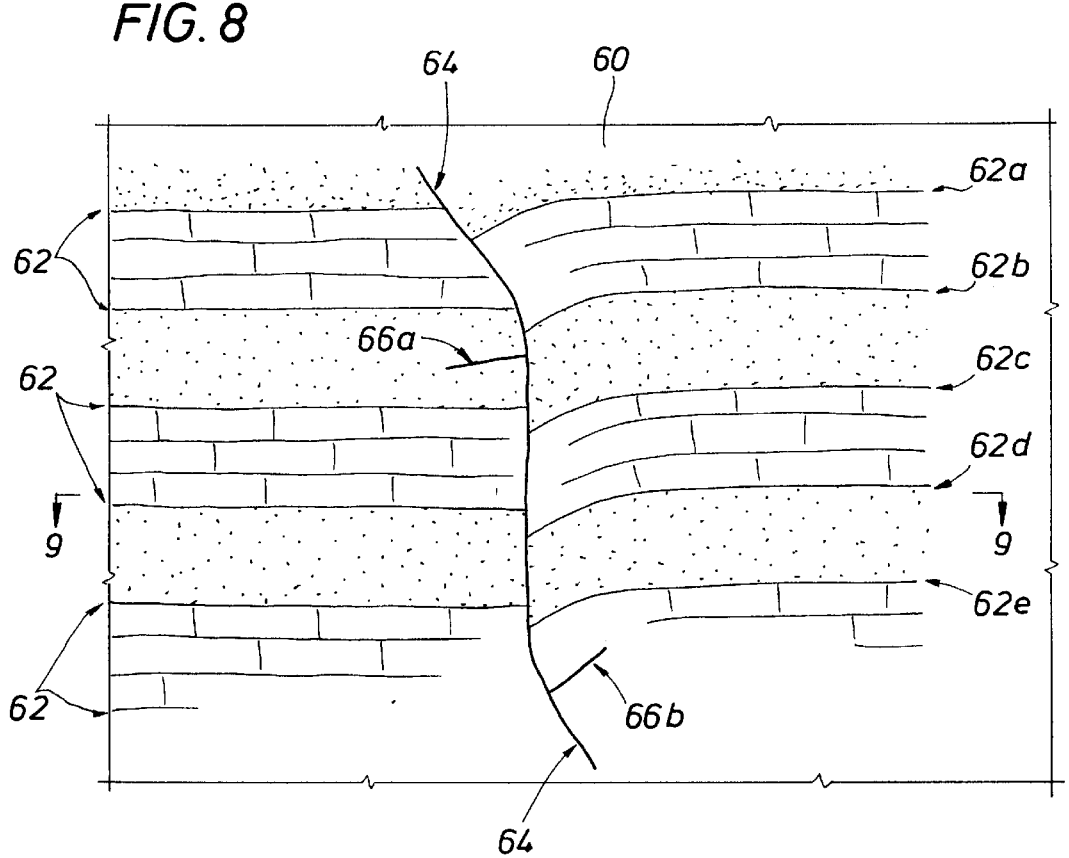
FIGS. 8 through 12 illustrate an earth formation including different horizons which are intersected by a plurality of faults.

In FIG. 8, another cross section of an earth formation, similar to that of FIG. 1, is illustrated. The formation located below the surface 60 of the earth includes a plurality of horizons 62. A horizon 62 is defined to be the top layer of a section of the formation. For example, horizon 62a is the top layer of a limestone section of the formation, horizon 62b is the top layer of a sand section of the formation, horizon 62c is the top layer of another limestone section of the formation, horizon 62d is the top layer of another sand section of the formation, and horizon 62e is the top layer of another limestone section of the formation. A first fault 64 runs approximately transversely through each of the horizons 62a through 62e in FIG. 8. However, another pair of smaller second faults 66a and 66b abut against the first fault 64, second fault 66a intersecting the first fault 64 from below the first fault 64, and second fault 66b intersecting the first fault 64 from above the first fault 64.

Figure 9:
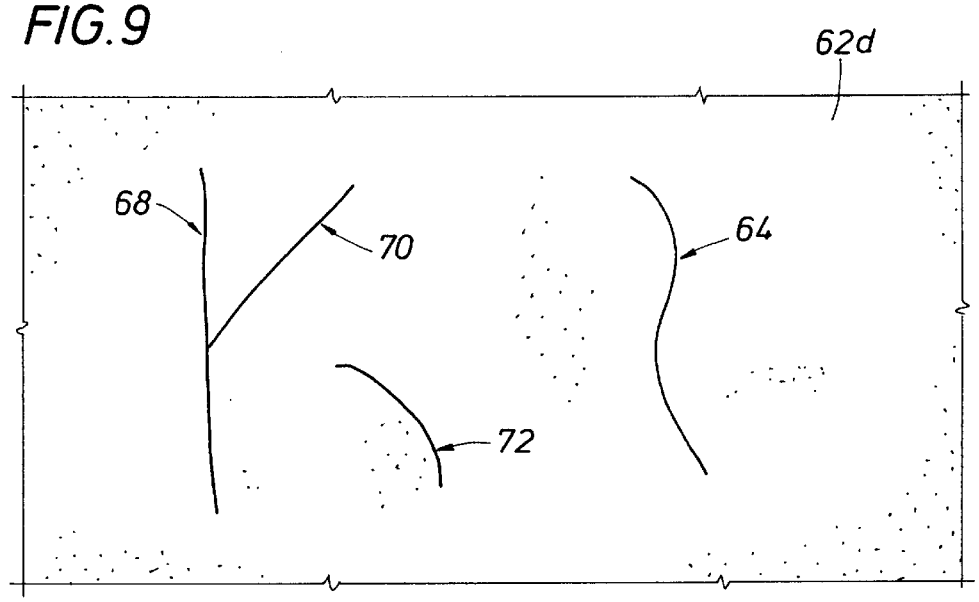

In FIG. 9, the top of one of the horizons 62a through 62e is illustrated. For example, FIG. 9 could represent a top view of the horizon 62d of FIG. 8 taken along section lines 9—9 of FIG. 8. In FIG. 9, the first fault 64 is illustrated. In addition, in FIG. 9, other faults 68, 70, and 72, which could pass through the horizon 62d, are also illustrated. Note that fault 68 intersects fault 70, but fault 72 fails to intersect any other fault, and fault 64 also fails to intersect any other fault other than faults 66a and 66b in FIG. 8. At this point, we do not know which of the faults 68 and 70 is the major fault, and which is the minor fault.

Figure 10:
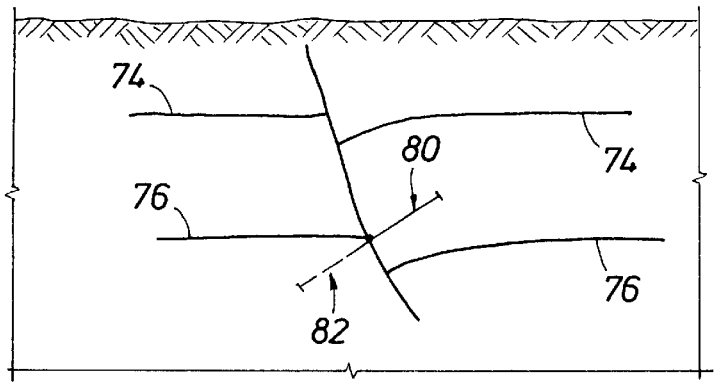

In FIG. 10, another cross sectional view of an earth formation is illustrated. In this figure, a fault 78 passes through a pair of horizons 74 and 76. The fault 78 appears to be a major fault. However, a fault 80 passes through the fault 78. The fault 80 appears to be a minor fault. In FIG. 10, the minor fault 80 is illustrated as intersecting the major fault 78 from above the major fault 78; therefore, as indicated by the dotted line 82, the minor fault 80 is "truncated" below the major fault 78; that is, since the minor fault 80 intersects the major fault 78 from above the major fault 78, that portion of the minor fault 80 which is located below the major fault 78 is "thrown away" for purposes of this invention. This concept will be discussed in greater detail later in this specification.

Figure 11:
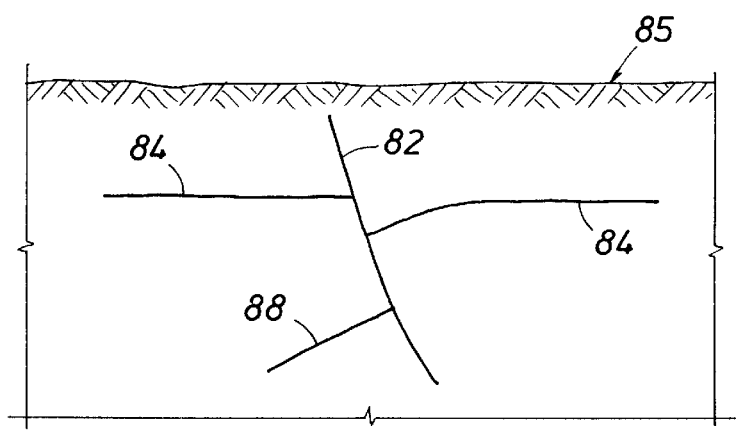
Figure 12:
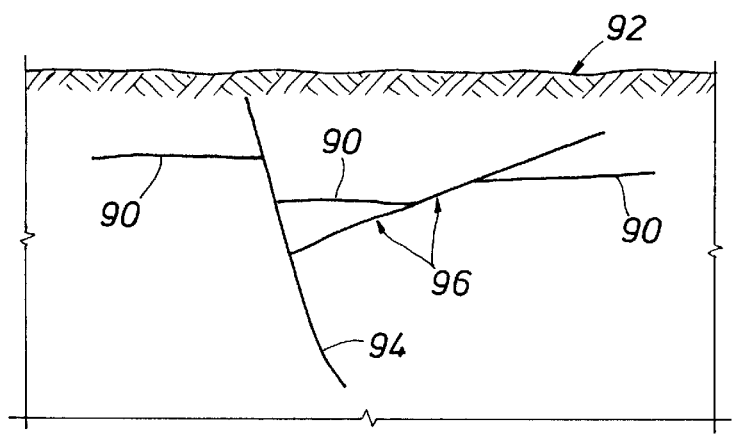

In FIGS. 11 and 12, still other cross sectional views of an earth formation are illustrated. In FIG. 11, a horizon 84, situated below the earth's surface 85, is intersected by a major fault 86, and a minor fault 88 intersects the major fault 86 from below the major fault 86. In FIG. 12, a horizon 90, situated below the earth's surface 92, is intersected by a major fault 94, and a minor fault 96 intersects the major fault 94 from above the major fault 94.

Figure 13:
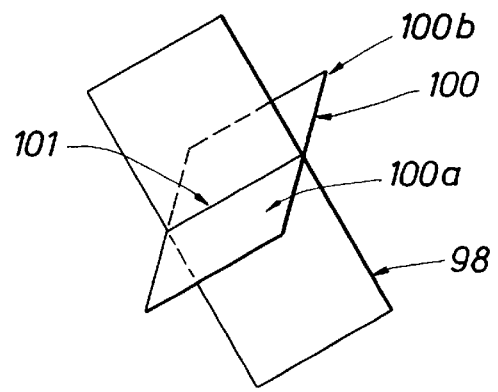
FIG. 13 illustrates a 3-dimensional view of a fault pair, one of which is the major fault and the other of which is minor fault.

In FIG. 13, a pair of intersecting faults 98 and 100, in three dimensions, is illustrated. Clearly, fault 98 is related to (i.e., it intersects) the fault 100. As a result, a "fault-fault intersection line" 101 is defined to be the line which represents the "intersection" between the fault 98 and the fault 100. However, we are not sure, at this point, which fault (98 or 100) is the major fault, and which fault (98 or 100) is the minor fault. If fault 98 is deemed to be the major fault, then fault 100 would appear to be the minor fault. If fault 100 is the minor fault, we still do not know which end of the minor fault 100 (end 100a or 100b) has the highest number determinate nodes. Therefore, we do not know whether that end of minor fault (end 100a or 100b) which has the highest number of determinate nodes intersects the major fault from above or below the major fault and therefore whether the other end of the minor fault (end 100a or 100b) which has the least number of determinate nodes is "truncated" below or above the major fault. Recall that the word "truncated" indicates that the end of the minor fault (end 100a or 100b) which has the least number of determinate nodes should be "thrown away" for purposes of this invention.

Figure 14A:
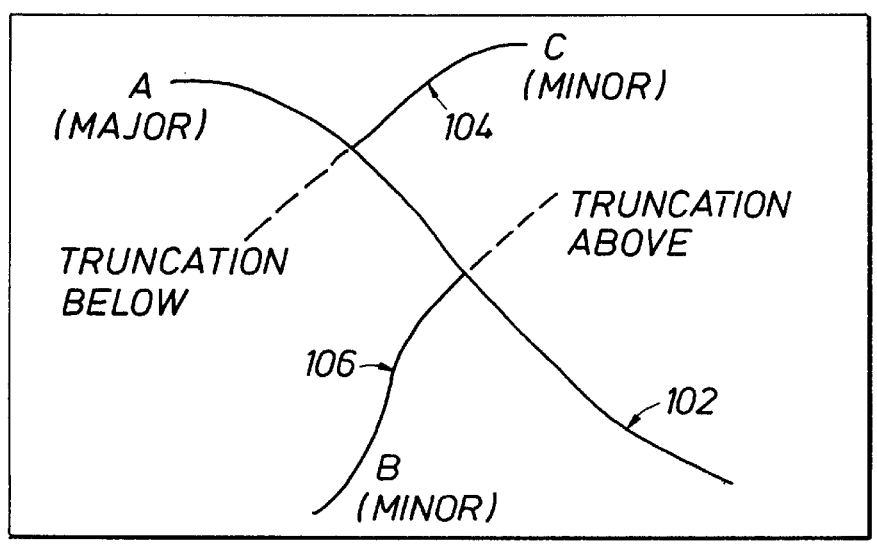
FIGS. 14a and 14b illustrate 2-D cross-section or profile views slicing through 3-D fault surfaces, these figures being used to provide a definition of "major" and "minor" faults and a definition of a minor fault which is truncated below and above the major fault.
Figure 14B:
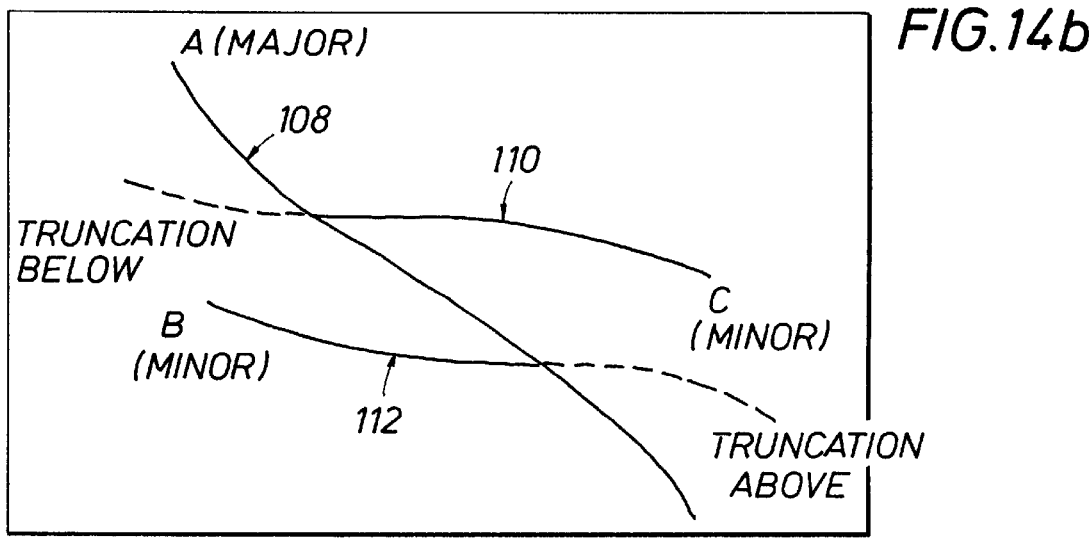

In FIGS. 14a and 14b, the definitions of "truncated above" and "truncated below" (as in "the minor fault is truncated above the major fault" or "the minor fault is truncated below the major fault") are illustrated in graphical detail. FIGS. 14a and 14b illustrate 2-D cross-section or profile views slicing through 3-D fault surfaces (not map views looking down on fault geometries).

In FIG. 14a, a first minor fault 104 intersects a major fault 102 from above the major fault 102; as a result, the minor fault 104 is truncated below the major fault 102. In this case, the part of the minor fault 104 which is shown as a dotted line and is located below the major fault 102 is "thrown away" for purposes of this invention. In addition, a second minor fault 106 intersects the major fault 102 from below the major fault 102 and therefore is truncated above the major fault 102. In this case, the part of the minor fault 106 which is shown as a dotted line and is located above the major fault 102 is "thrown away" for purposes of this invention.

In FIG. 14b, a first minor fault 110 intersects a major fault 108 from above the major fault 108 and is therefore truncated below the major fault 108. In this case, the part of the minor fault 110 which is shown as a dotted line and is located below the major fault 108 is "thrown away" for purposes of this invention. In addition, a second minor fault 112 intersects the major fault 108 from below the major fault 108 and is therefore truncated above the major fault 108. In this case, the part of the minor fault 112 which is shown as a dotted line and is located above the major fault 108 is "thrown away" for purposes of this invention.

Figure 15:
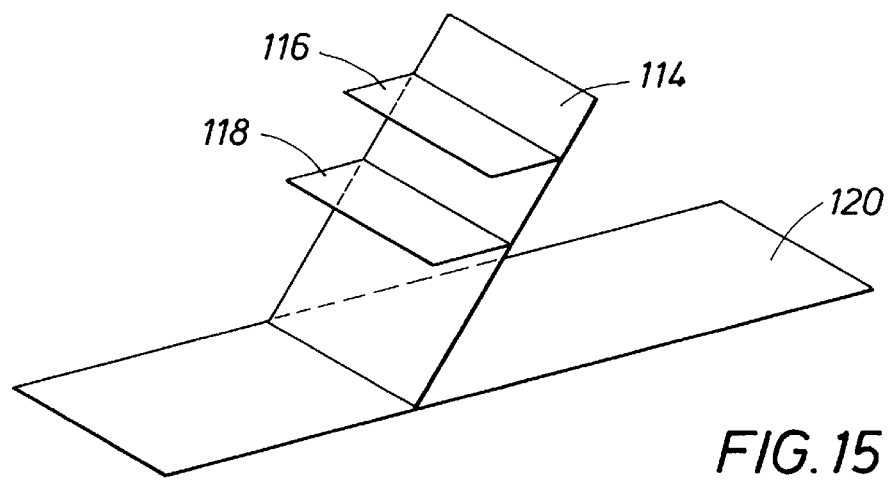
FIG. 15 illustrates how a major fault with respect to a first minor fault may, itself, be a minor fault with respect to another major fault.

In FIG. 15, a major fault 114 is intersected by two minor faults 116 and 118. However, the major fault 114 (which is major to minor faults 116 and 118) is, itself, a minor fault 114 to another more major fault 120. Therefore, a fault can function simultaneously as both a major fault and a minor fault, since fault 114 in FIG. 15 is both a major fault (to faults 116, 118) and a minor fault (to fault 120).

Detailed Description of the "Creating a Grid Based Surface Model of Each Fault" Software 40b1 of FIG. 5

The following five references discuss "surface modelling" in connection with the "Creating a Grid Based Surface Model of Each Fault" software 40b1 of FIG. 5. The disclosures in the following five references are incorporated by reference into this specification: (1) CPS-3 Technical Reference Manual, Chapter 6, "Surface Procedures" pp. 6–24 to 6–39, 6–14 to 6–15, Published by Schlumberger-Geoquest, (2) CPS-3 User's Guide, Volume 1, Chapter 8, "Surface Modeling", pp. 8–15 to 8–50, Published by by Schlumberger-GeoQuest, (3) CPS-3 User's Guide, Vol. 2, Chapter 9, pp 9–37 to 9–58, "Horizon Modeling", (4) "Machine Contouring using minimum Curvature", Ian C. Briggs, Geophysics, Vol 39, No. 1, February 1974, pp 39–48 (The "Briggs Method" described in this reference is the core algorithm of the primary modeling procedures in CPS-3 which create grid-based surface models), and (5) "Automatic Contouring of Faulted Subsurfaces", G. Bolondi, F. Rocca, and S. Zanoletti, Geophysics, Vol. 41, No. 6, December 1976, pp 1377 to 1393.

Figure 16:
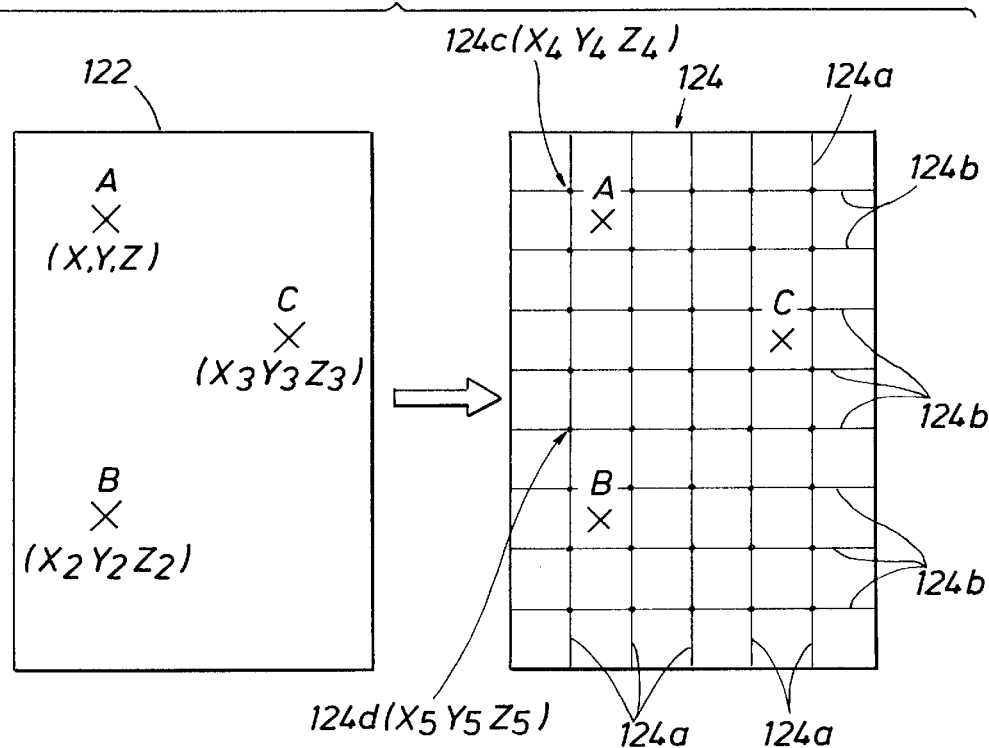
FIG. 16 illustrates the functional operation of a block of software, stored in the workstation of FIG. 5, entitled "Creating a Grid Based Surface Model of Each Fault"

In FIG. 16, assume that surface 122 in FIG. 16 represents a fault surface, similar to all the other faults surfaces discussed above, such as faults 114, 116, 118 and 120 of FIG. 15, or faults 98 and 100 of FIG. 13.

In FIG. 6a, the "reduced data output record medium" 30d, which was input to the interpretation workstation 40 of FIG. 5, contained "information pertaining to the multitude of faults" (15 of FIG. 1), at least some of the pairs of the multitude of faults intersecting and having the raw form as indicated in FIG. 6a. More particularly, the "information pertaining to the multitude of faults", in the "reduced data output record medium" 30d of FIG. 6a, is actually comprised of a "multitude of points", where each point in the multitude of points has a unique (x, y, z) coordinate in an (x, y, z) coordinate system. Therefore, assuming that the "multitude of points" (in the "information pertaining to the multitude of faults" in the "reduced data output record medium" 30d) is actually comprised of a first plurality of points, a second plurality of points, a third plurality of points, etc, the first plurality of the points of the "multitude of points" may represent a "first fault", the second plurality of the points of the "multitude of points" may represent a "second fault", the third plurality of the points of the "multitude of points" may represent a "third fault", etc.

In FIG. 16, the fault surface 122 is therefore comprised of a "fourth plurality of points" of the "multitude of points" in the "reduced data output record medium" 30d of FIG. 6a, the "fourth plurality of points" including: a point "A" having the coordinates (x1, y1, z1), a point "B" having the coordinates (x2, y2, z2), and a point "C" having the coordinates (x3, y3, z3).

The overall function and purpose of the "Creating a Grid Based Surface Model of Each Fault" software 40b1 of FIG. 5 is to convert the fault surface 122 (which is comprised of the "fourth plurality of points" including points A, B, and C) into another fault surface 124 which has a network of uniformly spaced horizontal and perpendicular intersecting lines (called grids) 124a and 124b imposed thereon, where each of the intersections of each of the horizontal and perpendicular intersecting lines 124a, 124b of the grid has its own unique (x, y, z) coordinate. In the following paragraphs, each of the intersections of each of the horizontal and perpendicular intersecting lines 124a, 124b of the grid on fault surface 124 of FIG. 16 will be called a "determinate node". For example, intersection 124c of fault surface 124 in FIG. 16 is a "determinate node" and intersection 124d of fault surface 124 in FIG. 16 is another "determinate node".

In FIG. 16, with respect to fault surface 124, (1) point A on fault surface 124 has the coordinates "(x1, y1, z1)", point "B" on fault surface 124 has the coordinates "(x2, y2, z2)", and point "C" on the fault surface 124 has the coordinates "(x3, y3, z3)"; (2) points A, B, and C on fault surface 124 do not coincide with any of the "determinate nodes" on the fault surface 124, and (3) the fault surface 124 includes a plurality of such determinate nodes, such as determinate nodes 124c and 124d, and each determinate node must have its own (x, y, z) coordinate.

The "Creating a Grid Based Surface Model of Each Fault" software 40b1 of FIG. 5 uses a technique called "interpolation". That is, given the known (x, y, z) coordinate for point A [(x1, y1, z1)] and point B [(x2, y2, z2)] and point C [(x3, y3, z3)] on fault surface 124 in FIG. 16, the "Creating a Grid Based Surface Model" software 40b1 will determine, by interpolation, the (x, y, z) coordinate for each determinate node, including determinate nodes 124c and 124d, on the grid 124a,124b of the fault surface 124 of FIG. 16.

For example, we know that point "A" has the coordinates (x1, y1, z1). Therefore, given the coordinates (x1, y1, z1) for point "A", the (x, y, z) coordinates of determinate node 124c can be determined by interpolation to be "(x4, y4, z4)". Similarly, we know that point "B" has the coordinates (x2, y2, z2). As a result, the (x, y, z) coordinates of determinate node 124d can be determined by interpolation to be "(x5, y5, z5)".

As a result, when the processor 40a of the interpretation workstation 40 of FIG. 5 executes the "Creating a Grid Based Surface Model" software 40b1 stored in the memory 40b, the (x, y, z) coordinates for all of the "determinate nodes" on fault surface 124 in FIG. 16, including the determinate nodes 124c and 124d which lie on the grid 124a and 124b of the fault surface 124 of FIG. 16, will be determined by the interpolation technique.

In fact, when the processor 40a of the interpretation workstation 40 of FIG. 5 executes the "Creating a Grid Based Surface Model" software 40b1 stored in the memory 40b, the (x, y, z) coordinates for all of the "determinate nodes" of each of the multitude of faults (15 of FIG. 1) inherent in the "information" contained within the "reduced data output record medium" 30d, which was input to the interpretation workstation 40 of FIG. 5, will be determined by the interpolation technique.

In the following paragraphs, each of the blocks of code (blocks 50 and 52 and 54 and 56 of FIG. 7) of the "Establish Geologic Consistancy" 40b2 software of the present invention will be discussed below with reference to FIG. 17 through FIG. 21 of the drawings.

Determine if a Particular Pair of Faults Relate, Block 50

When the processor 40a of the interpretation workstation 40 of FIG. 5 executes of the "Creating a Grid based Surface Model" software 40b1 stored in the memory 40b, the (x, y, z) coordinates for all the "determinate nodes" of each fault surface 15 of FIG. 1 will be determined. As a result, the processor 40a of the interpretation workstation 40 will now begin the execution of the "Establish Geologic consistancy" software 40b2 stored in the memory 40b of the workstation 40 of FIG. 5.

Recall with reference to FIG. 7 that, when the processor 40a of the interpretation workstation 40 of FIG. 5 executes the "Establish Geologic Consistancy" software 40b2 of the present invention, the workstation 40 processor 40a will respond to all of the (x, y, z) coordinates of the determinate nodes (on each of the grids of each of the multitude of faults 15 in the "information relating to the multitude of faults 15 in the earth formation" which is contained within the "Reduced Data Output Record Medium" 30d of FIG. 5) by performing the following functional steps, as indicated in FIG. 7:

(1) Determine if a particular pair of faults Relate (i.e., do the pair of faults intersect)—block 50, (2) Following step 1, determine which fault of the intersecting pair of faults is the "major" fault and which fault of the pair is the "minor" fault—block 52, (3) Following step 2, determine if the minor fault intersects the major fault from above or below the major fault—block 54, and (4) Following step 3, determine that the minor fault is truncated below or above the major fault—block 56.

In order to determine if a particular pair of faults (of the multitude of faults 15 inherently contained within the reduced data output record medium 30d of FIG. 5) "relate" (block 50, FIG. 7), we must know if that particular pair of faults intersect.

As a result, when the processor 40a of the workstation 40 of FIG. 5 executes the "Establish Geologic Consistency" software 40b2 of FIG. 5, three (3) steps are performed by the processor 40a for the purpose of determining if a particular pair of faults, in the multitude of faults 15, "relate" or "intersect":

Step 1—Place a Bounding Box around each fault

Figure 17:
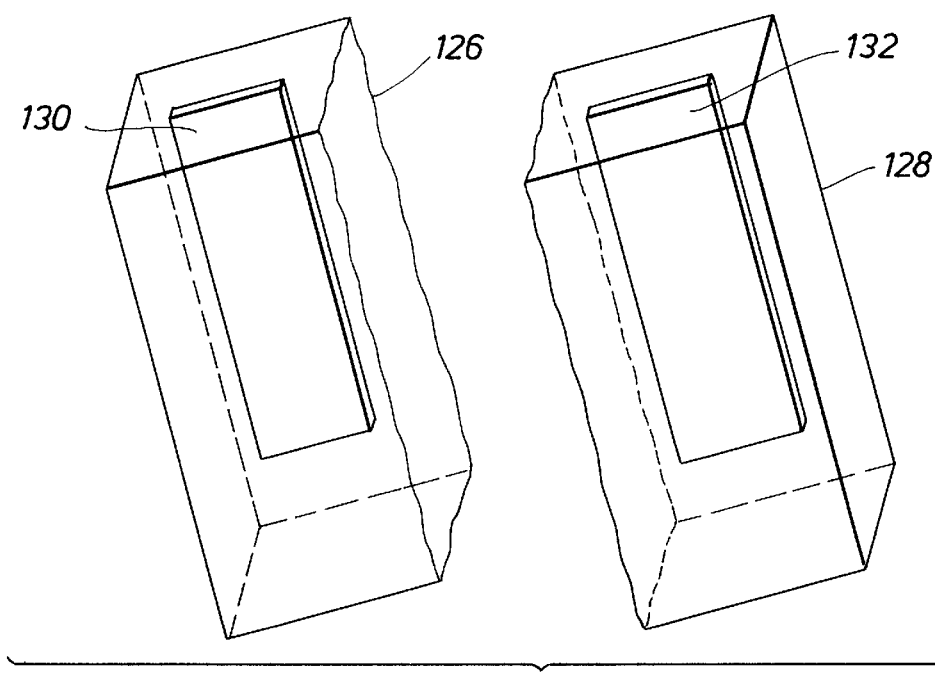

In FIG. 17, place a bounding box 126, 128 around each fault 130, 132 of a pair of faults.

If the bounding boxes 126, 128 of the pair of faults 130, 132 do not intersect, the faults 130, 132 inside the bounding boxes 126, 128 do not intersect and therefore the pair of faults 130, 132 inside the bounding boxes 126, 128 do not relate. Since the pair of faults 130,132 do not relate, there is no need to continue with the following analysis relative to faults 130,132.

However, if the bounding boxes 126, 128 around the pair of faults 130, 132 do, in fact, intersect, we must still determine (in step 2 below) whether the faults 130, 132 themselves, inside the intersecting bounding boxes 126, 128, also intersect.

Step 2—Subtract coordinates of determinate node pairs

Figure 18A:
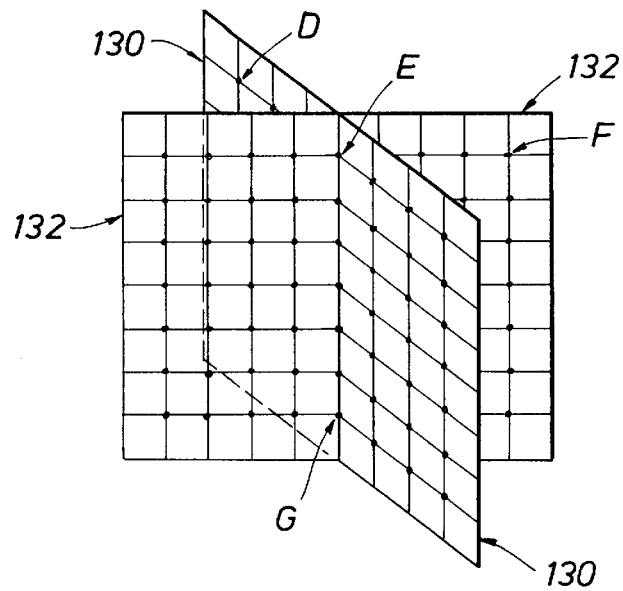

In FIG. 18a, when the bounding boxes 126, 128 of the pair of faults 130, 132 have been determined (in step 1 above) to intersect, in order to further determine whether the faults 130, 132 inside the bounding boxes 126, 128 also intersect, it is necessary to perform the following step: subtract each determinate node of a first fault surface from each corresponding determinate node of a second fault surface.

If, as a result of the subtraction of each determinate node of the first fault surface from each corresponding determinate node of the second fault surface, one or more "zero (0) value coordinates" are determined to exist, the first fault surface would "intersect" the second fault surface. A "zero (0) value coordinate" is defined to be the following (x, y, z) coordinate: "(x, y, 0)". The zero value coordinate is "(x, y, 0)" because only "z" values are subtracted and only at like (x, y) locations. If, following a subtraction, the "z" values are zero and "x" and "y" values are the same for the two fault surfaces, then the two fault surfaces intersect at these points.

For example, in FIG. 18a, fault surface 130 has been divided up into grids (by the "creating a grid based surface model" software 40b1 of FIG. 5) and it includes a plurality of determinate nodes, including determinate nodes D, E, and G. Fault surface 132 has also been divided up into grids (by the "creating a grid based surface model" software 40b1) and it includes a plurality of determinate nodes, including determinate nodes F, E, and G.

Determinate nodes D, E and G for fault surface 130 could have the following (x, y, z) coordinates:
1. Node D has coordinates (x6, y6, z6)
2. Node E has coordinates (x7, y7, z7); and
3. Node G has coordinates (x8, y8, z8)

Determinate nodes F, E, and G for fault surface 132 could have the following (x, y, z) coordinates:
1. Node F has coordinates (x6, y6, z9)
2. Node E has coordinates (x7, y7, z7); and
3. Node G has coordinates (x8, y8, z8)

In FIG. 18a, note that the determinate nodes E and G for fault surface 130 and fault surface 132 have the same (x, y, z) coordinates: "(x7, y7, z7)" and "(x8, y8, z8)", respectively.

As a result, when the coordinates (x7, y7, z7) for node E of fault 132 is subtracted from the coordinates (x7, y7, z7) of node E for fault 130, the result of the subtraction is the following zero (0) value coordinate: "(x7, y7, 0)".

Similarly, when the coordinates (x8, y8, z8) for node G of fault 132 is subtracted from the coordinates (x8, y8, z8) for node G of fault 130, the result of the subtraction is the following zero (0) value coordinate: "(x8, y8, 0)".

Consequently, in FIG. 18a, the fault surface 130 of FIG. 18a intersects the fault surface 132 at the determinate nodes "E" and "G".

On the other hand, in FIG. 18a, the (x, y, z) coordinate for determinate node D on fault surface 130 "(x6, y6, z6)" is different from the (x, y, z) coordinate for determinate node F on fault surface 132 "(x6, y6, z9)". Therefore, when the (x, y, z) coordinates for node F of fault surface 132 "(x6, y6, z9)" is subtracted from the (x, y, z) coordinates for node D of fault surface 130 "(x6, y6, z6)", the result of the subtraction would be the following "non-zero" value coordinate: "[x6, y6, (z6-z9)]". Therefore, since the z-value "(z6-z9)", of the above "non-zero" value coordinate, is non-zero and yet the "x" and "y" values are the same "(x6, y6)", the determinate node D on fault surface 130 of FIG. 18a does not intersect the determinate node F on fault surface 132. However, the determinate nodes E and G on fault surface 130 does, in fact, intersect the determinate nodes E and G on fault surface 132. As a result, the determinate nodes E and G would appear to fall on a "fault-fault intersection line" (i.e., the line where fault 130 intersects fault 132), similar to the fault fault intersection line 101 of FIG. 13.

However, it is possible that no differenced nodes are exactly (x, y, 0) and yet the two fault surfaces would still intersect. This can happen because of the discrete nature of the nodes in a grid based representation of surface models. If, following a subtraction of two (x, y, z) coordinates for two determinate nodes, there exist no differenced nodes which result in a zero (0) z-value, but some result in positive difference values "(x, y, +)" and some result in negative difference values "(x, y, −)", then there is an implicit intersection between the two surfaces. This intersection would take the form of a fault-fault intersection line running 'somewhere between' the positive difference node and the negative difference node, but not necessarily through any actual "determinate node" in the grid based surface representation.

In FIG. 18a1, the "−" represents a "determinate node location" (x, y, z) where:

z1(value at fault F1)−z2(value at fault F2)<0.

However, in FIG. 18a1, the "+" represents a "determinate node location" (x, y, z) where:

z1(value at fault F1)−z2(value at fault F2)>0.

In this scenario, no discrete grid node locations result in a z-value difference figure of "0". However, an implied intersection line consisting of arbitrary (x, y, 0) locations do exist "between" the positive and negative determinate node locations. Thus, if the determinate nodes are viewed in this way, it is sufficient to say that, when "some" determinate nodes relate in a positive way and yet "some" other determinate nodes in a negative way, the fault surfaces do intersect. On the other hand, it is also possible to say that when "all" determinate nodes relate in a positive way or when "all" determinate nodes relate in a negative way, the fault surfaces do not intersect.

Figure 18B:
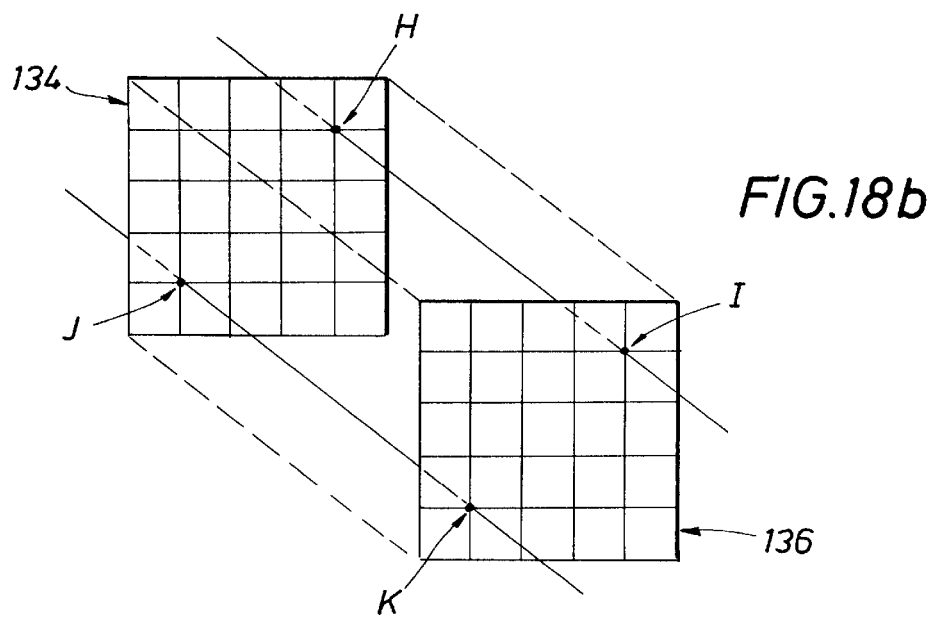

In FIG. 18b, however, fault surface 134 contains determinate nodes H and J, and fault surface 136 contains determinate nodes I and K. When the (x, y, z) coordinates for determinate node "I" on fault surface 136 is subtracted from the (x, y, z) coordinates for the determinate node "H" on fault surface 134, if the result of this subtraction is a non-zero value coordinate, such as (x11, y11, z11), then determinate node "I" on fault surface 136 does not intersect with determinate node "H" on fault surface 134. Similarly, when the (x, y, z) coordinates for determinate node "K" on fault surface 136 is subtracted from the (x, y, z) coordinates for the determinate node "J" on fault surface 134, if the result of this subtraction is a non-zero value coordinate, such as (x12, y12, z12), determinate node "K" on fault surface 136 does not intersect with determinate node "J" on fault surface 134. In FIG. 18b, it appears that fault surface 134 is parallel to fault surface 136. In general, when a fault surface 134 is parallel to a fault surface 136, the fault surface 134 will not intersect with the fault surface 136, and therefore the fault surfaces 134 and 136 will not "relate". As a result, since the fault surface 134 is parallel to the fault surface 136, when a first plurality of the (x, y, z) coordinates for corresponding determinate nodes (such as nodes H and J) on fault surface 134 are subtracted from a second plurality of the (x, y, z) coordinates for corresponding determinate nodes (such as nodes I and K) on fault surface 136, the results of the above referenced subtraction will produce a respective third plurality of non-zero value coordinates, such as (x13, y13, z13), (x14, y14, z14), etc. When the results of the above referenced subtraction produces a respective third plurality of non-zero value coordinates, the faults 134, 136 of FIG. 18b do not intersect and do not "relate".

Step 3—Compute Fault-Fault intersection line

Figure 19:
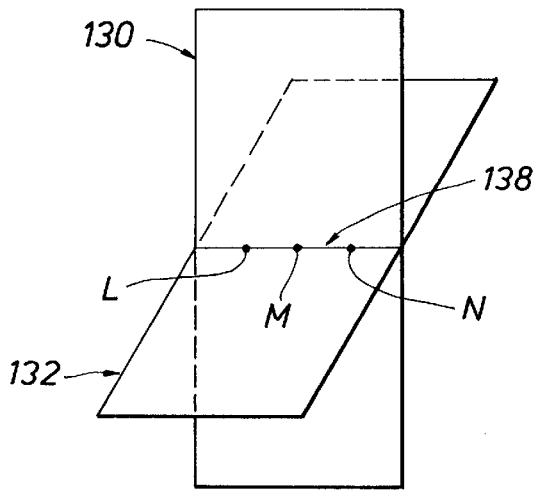

In FIG. 19, compute and determine a fault-fault intersection line 138 between a first fault surface 130 and a second fault surface 132.

From step 2 with reference to FIG. 18a, the (x, y, z) coordinates for corresponding determinate node pairs on fault surfaces 130, 132 were subtracted from each other. When, for a particular corresponding determinate node pair, the result of that subtraction was a zero value coordinate, such as (x, y, 0), that particular corresponding determinate node pair on fault surfaces 130, 132 is said to "intersect" or "relate". Recall, however, that it is not necessary that the fault-fault intersection line "run through" determinate nodes although it is possible that the fault-fault intersection line will, in fact, "run through" determinate nodes. However, it is also possible that the fault-fault intersection line will traverse the coverage area running entirely "between" the discrete determinate node locations without running "through" any determinate node locations.

In FIG. 19, a fault-fault intersection line 138 is defined to be the line of intersection between faults 130 and 132. Assume the fault-fault intersection line 138 includes three determinate nodes "L", "M", and "N"; that is, a determinate node L lies on both faults 130 and 132, a determinate node M lies on both faults 130 and 132, and a determinate node N lies on both faults 130 and 132. When the (x, y, z) coordinates for node L on fault 130 is subtracted from the (x, y, z) coordinates for node L on fault 132, and the (x, y, z) coordinates for node M on fault 130 is subtracted from the (x, y, z) coordinates for node M on fault 132, and the (x, y, z) coordinates for node N on fault 130 is subtracted from the (x, y, z) coordinates for node N on fault 132, if three zero value coordinates result from that subtraction, such as (x14, y14, 0) for node L, (x15, y15, 0) for node M, and (x16, y16, 0) for node N, the determinate nodes L, M, and N, on fault surfaces 130 and 132, are said to "intersect" and "relate". As a result, in FIG. 19, a "fault-fault intersection line" 138 is formed along the determinate nodes L, M, and N at the intersection of fault surfaces 130 and 132, the fault-fault intersection line 138 being comprised of all determinate nodes, including nodes L and M and N, for which the above referenced subtraction of the (x, y, z) coordinates for corresponding determinate node pairs on faults 130, 132 produces the following generic zero value coordinate: "(x, y, 0)".

Determine which fault of the intersecting pair of faults is the major fault and which fault of the pair is the minor fault—block 52

In FIG. 6a, a multitude of faults 15 are contained within the "information" stored in the "reduced data output record medium" 30d, and at least some of the pairs of these multitude of faults are "intersecting" faults.

In FIG. 6b, as a result of the execution of the "Establish Geologic Consistancy" software 40b2 of FIG. 5, the output display 40c of the interpretation workstation 40 FIG. 5 will display a pair of intersecting faults 46a and 46b, where the fault 46a has been determined to be the "major" fault, and the fault 46b has been determined to be the "minor" fault.

There are at least three (3) methods for determining which fault of an intersecting fault pair (that are said to "relate" or "intersect") is the "major" fault, and which fault of the intersecting fault pair is the "minor" fault:

Method 1 Considering an arbitrary pair of intersecting faults ("fault 1" or "F1" and "fault 2" or "F2"), the one fault of the intersecting fault pair that is "larger" (i.e.—has the highest number of determinate nodes) than the other fault of the pair is determined to be the "major" fault, and the other remaining fault is the "minor" fault. Therefore, if fault F1 is "larger" than fault F2, or if fault F1 has a number of determinate nodes which is greater than the number of determinate nodes in fault F2, then, fault F1 is the major fault and fault F2 is the minor fault. However, there are a number of intersecting fault pairs, in the multitude of faults inherently contained within the "reduced data output record medium" of FIG. 6a, for which this method (of determining the major fault and the minor fault) is not sufficient or feasible. Therefore, a more scientific approach is needed.

Method 2 If the "aerial extent" (hereinafter abbreviated as "AE") of fault F1 is greater than two (2) multiplied by the aerial extent of fault F2, then, fault F1 is the "major" fault, fault F2 is the "minor" fault, and minor fault F2 terminates against major fault F1. The shorthand notation for this Method 2 can be expressed as follows:

(a) If "F1(AE)>2 F2(AE)", then, fault F1 is the "major" fault and fault F2 is the "minor" fault. On the other hand, if "F2(AE)>2 F1(AE)", then fault F2 is the major fault and fault F1 is the minor fault.

Figure 20A:
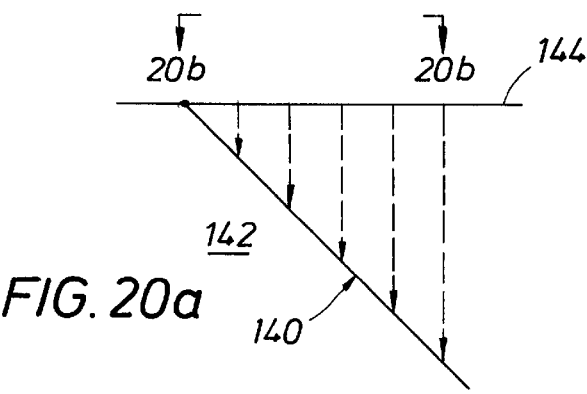
FIGS. 20a–20b and 21 are used in connection with a discussion for determining which fault of a pair of intersecting faults (determined to be intersecting from FIGS. 17 through 19) is the major fault, which fault of the pair of intersecting faults is the minor fault, and whether the minor fault intersects the major fault from below the major fault (that is, the minor fault is truncated above the major fault) or whether the minor fault intersects the major fault from above the major fault (that is, the minor fault is truncated below the major fault).
Figure 20B:
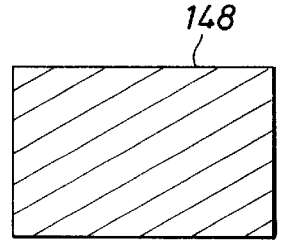

In FIGS. 20a and 20b, a definition of the term "aerial extent" is illustrated. In FIG. 20a, assume that a fault 140 traverses an earth formation 142 situated below a surface 144 of the earth. The "aerial extent" of fault 140 of FIG. 20a would be a number representing an "area" 148 illustrated in FIG. 20b, the area 148 in FIG. 20b being visible when viewed downwardly onto the fault 140 in FIG. 20a from a location situated above the fault 140 in FIG. 20a. The downward view is illustrated in FIG. 20a by section lines 20b–20b in FIG. 20a. Therefore, the area 148 of FIG. 20b would represent the "aerial extent (AE)" of the fault 140 of FIG. 20a.

There is experimental evidence that "Method 2" is the way to grossly determine the "major" fault of a fault pair. By examination of a multitude of faults, in many geologic scenarios, it was determined that "Method 2" was the appropriate factor to apply which gave the optimum result.

By experimental observation, it was shown that, by relaxing the "Method 2" criteria, faults which were "major" were identified as "minor" and, by strengthening the "Method 2" criteria, "no decision was reached" for fault pairs which exhibited an obvious "major vs. minor" relationship. Therefore, from a statistical point of view, "Method 2" was determined to be the optimum initial criteria.

However, a still more scientific method is discussed in the next method.

Method 3

Figure 21:
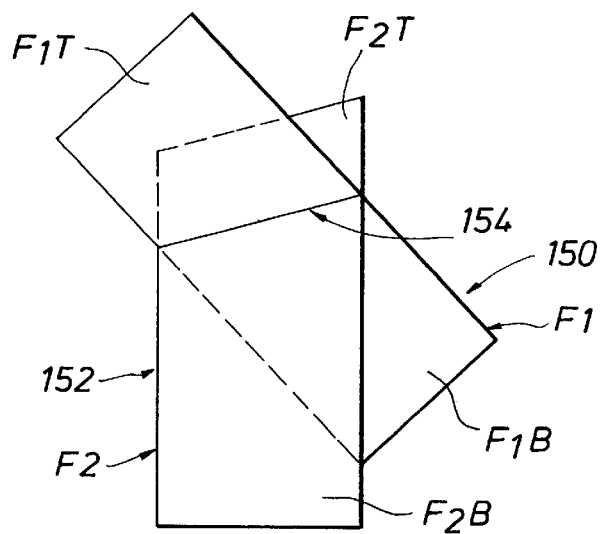

In FIG. 21, a first fault (F1) 150 intersects a second fault (F2) 152 and a fault fault intersection line 154 divides each fault F1 and F2 into two parts. The first fault (F1) 150 is divided into two sections: a top section "F1T" disposed on one side of the fault fault intersection line 154, and a bottom section "F1B" disposed on the other side of the fault fault intersection line 154. The second fault (F2) 152 is divided into two sections: a top section "F2T" disposed on one side of the fault fault intersection line 154 and a bottom section "F2B" disposed on the other side of the fault fault intersection line 154.

The "creating a grid based surface model" software 40b1 of FIG. 5 has already divided the first fault F1 150 of FIG. 21 into a grid having a plurality of determinate nodes (like determinate nodes 124c and 124d) in the manner discussed above with reference to FIG. 16, and the "creating a grid based surface model" software 40b1 has also divided the second fault F2 152 of FIG. 21 into a grid having a plurality of determinate nodes in the manner discussed above with reference to FIG. 16.

In FIG. 21, in order to determine which fault of the intersecting pair of faults 150, 152 is the "major" fault and which fault of the pair of faults 150, 152 is the "minor" fault, compute:

(1) the number of determinate nodes (e.g., nodes 124c and 124d in FIG. 16) in the "F1T" section of fault F1 150, (2) the number of determinate nodes in the "F1B" section of fault F1 150, (3) the number of determinate nodes in the "F2T" section of fault F2 152, and (4) the number of determinate nodes in the "F2B" section of fault F2 152.

In FIG. 21, for a first example, assume that the number of determinate nodes in the "F1T" part of fault F1 150 is 300, the number of determinate nodes in the "F1B" part of Fault F1 150 is 300, the number of determinate nodes in the "F2T" part of fault F2 152 is 50, and the number of determinate nodes in the "F2B" part of fault F2 is 300.

In addition, the term "Max (F2T, F2B)" means "a value which is equal to the number of determinate nodes in F2T or the number of determinate nodes in F2B, whichever is greater". Therefore, since the number of determinate nodes in F2T equals 50 and the number of determinate nodes in F2B equals 300, the term "Max (F2T, F2B)" equals 300, since 300 is greater than 50.

On the other hand, the term "Min (F2T, F2B)" means "a value which is equal to the number of determinate nodes in F2T or the number of determinate nodes in F2B, whichever is less". Therefore, since the number of determinate nodes in F2T equals 50 and the number of determinate nodes in F2B equals 300, the term "Min (F2T, F2B)" equals 50, since 50 is less than 300.

In FIG. 21, considering the aforementioned term definitions of "Max (F2T, F2B)" and "Min (F2T, F2B)", and using the aforementioned number of determinate nodes in F1T, F1B, F2T, and F2B (F1T=300, F1B=300, F2T=50, and F2B=300), the following algorithms will determine which fault (F1 150 or F2 152) is the "major" fault and which fault (F1 150 or F2 152) is the "minor" fault:

(a) If "F1(AE)>2 F2(AE)", then, fault F1 is the "major" fault and fault F2 is the "minor" fault. On the other hand, if "F2(AE)>2 F1(AE)", then fault F2 is the major fault and fault F1 is the minor fault.

(b) If (a) fails, then:

(b1) If: Min(F1T, F1B)/Max(F2T, F2B)>0.9, then, fault F1 is "major" and fault F2 is the "minor" fault; or (b2) If: Min(F2T, F2B)/Max(F2T, F2B)>0.9, then, fault F2 is "major" and fault F1 is the "minor" fault.

(c) If (a) and (b) fail, then:

(c1) If: Max(F1T, F1B)/Min(F1T, F1B) is less than (<) Max(F2T, F2B)/Min(F2T, F2B), then, fault F1 is "major" and fault F2 is the "minor" fault.

(c2) If: Max(F1T, F1B)/Min(F1T, F1B) is greater than (>) Max(F2T, F2B)/Min(F2T, F2B), then, fault F2 is "major" and fault F1 is the "minor" fault.

Determine if the minor fault intersects the major fault from above or below the major fault—block 54

Determine that the minor fault is truncated below or above the major fault—block 56

From the above discussion with reference to FIG. 21, three methods are discussed for determining whether fault F1 150 or fault F2 152 is the major fault. If fault F1 150 is the major fault, then, fault F2 152 is the minor fault. On the other hand, if fault F2 152 is the major fault, then, fault F1 150 is the minor fault.

Assume that we have determined that fault F1 150 is the major fault, and that fault F2 152 is the minor fault. Since fault F2 152 is the minor fault, recall from FIG. 21 that fault F2 is comprised of two sections: the top section F2T and the bottom section F2B.

In order to determine if the minor fault intersects the major fault from above or below the major fault and therefore that the minor fault is truncated below or above the major fault, we must first "discard" and "throw away" either the top section F2T or the bottom section F2B of the minor fault F2 152. However, to do this, we must first determine which section, either the top section "F2T" or the bottom section "F2B", should be discarded.

For example, if we discard the top section F2T of minor fault F2, we are left with the bottom section F2B, and the bottom section F2B of minor fault F2 would intersect the major fault F1 from either above or below the major fault F1, and would be truncated either below or above the major fault, respectively. On the other hand, if we discard the bottom section F2B of minor fault F2, we are left with the top section F2T, and the top section F2T of minor fault F2 would intersect the major fault F1 from either above or below the major fault F1, and would be truncated either below or above the major fault, respectively.

If the top section F2T of minor fault F2 has a number of determinate nodes which is less than the number of determinate nodes in the bottom section F2B, the top section F2T of fault F2 is discarded thereby leaving the bottom section F2B of minor fault F2. In this case, the bottom section F2B of the minor fault F2 would intersect the major fault F1 from either above or below the major fault. If the bottom section F2B of minor fault F2 intersects the major fault F1 from above the major fault, then the bottom section F2B of minor fault F2 is truncated below the major fault, and vise versa.

On the other hand, if the bottom section F2B of minor fault F2 has a number of determinate nodes which is less than the number of determinate nodes in the top section F2T, the bottom section F2B of fault F2 is discarded thereby leaving the top section F2T of minor fault F2. In this case, the top section F2T of the minor fault F2 would intersect the major fault F1 from either above or below the major fault. If the top section F2T of minor fault F2 intersects the major fault F1 from above the major fault, then the top section F2T of minor fault F2 is truncated below the major fault, and vise versa.

Detailed Description of the "Establish Geologic Consistancy Between Intersecting Faults" software 40b2 of FIG. 5

The following paragraphs will provide a detailed description of the "Establish Geologic Consistancy Between Intersecting Faults" software 40b2 stored in the memory 40b of the interpretation workstation 40 of FIG. 5.

1. Compute if fault F1 intersects fault F2.
Compute bounding box (BB1) of determinate nodes of F1
Compute bounding box (BB2) of determinate nodes of F2
if BB1 intersects BB2, then faults may intersect
   a) For each row
     For each column
       Zdiff=ZF1−ZF2
       If some Zdiff<0, then faults do intersect
Compute Fault-Fault ("F1t−F1t") intersection line
   a) Griddiff=GridF1−GridF2
   b) Compute x,y polyline representing solution where Griddiff=0. This forms F1t-F1t intersection line when z-values are attached from either F1 or F2. It represents the x, y, z polyline in space where F1 and F2 are equal 2. Retrieve z-type [positive subsea (depth/time)], [negative subsea (elevation)]
3. For each pair of intersecting fault surfaces:
Retrieve F1t-F1t intersection line (F1, F2)
   N1=# of determinate nodes of F1
   N2=# of determinate nodes of F2
   Nrow1=# of rows in F1 grid representation
   Ncol1=# of columns in F1 grid representation
   Nrow2=# of rows in F2 grid representation
   Ncol2=# of columns in F2 grid representation
   NT1=Nrow1* Ncol1=total nodes in F1
   NT2=Nrow2* Ncol2=total nodes in F2
Normalize total grid node cnts
    NCNT1=NT1
    NCNT2=(NT1*NT2)/NT1
   Xinc1=X-increment for F1
   Yinc1=Y-increment for F1
   Xinc2=X-increment for F2
   Yinc2=Y-increment for F3
   Xmin1=X-minimum for F1
   Ymin1=Y-minimum for F1
   Xmin2=X-mimimum for F2
   Ymin2=Y-mimimum for F2
Compute Bounding Box of determinate nodes for F2
   XBBmin2=minimum X-bound for determinate nodes, F2
   YBBmin2=minimum Y-bound for determinate nodes, F2
   XBBmax2=maximum X-bound for determinate nodes, F2
   YBBmax2=maximum Y-bound for determinate nodes, F2
Compute Bounding Box of determinate nodes for F1
   XBBmin1=minimum X-bound for determinate nodes, F1
   YBBmin1=minimum Y-bound for determinate nodes, F1
   XBBmax1=maximum X-bound for determinate nodes, F1
   YBBmax1=maximum Y-bound for determinate nodes, F1
Compute min/max row/column of determinate nodes for each F1,F2
   Imincol2=(XBBmin2−Xmin2)/Xinc2+1
   Imaxcol2=(XBBmax2−Xmin2)/Xinc2+1
   Iminrow2=(Xmax2−YBBmax2)/Yinc2+1
   Imaxrow2=(Xmax2−YBBmax2)/Yinc2+1
Retrieve F1 grid surface
Retrieve F2 grid surface
Decimate F1t-F1t polyline (for performance)
Extend F1t-F1t intersection line to edge of AOI by computing intersection of extension with AOI boundary (points A, B)
Determine number of determinate nodes on each side of the F1t-F1t intersection line of F1
Determine number of determinate nodes on each side of the F1t-F1t intersection line of F2
   a) Compute mask grid showing fault locations
   b) Compute average z-values of F1t-F1t vertices
   c) for each column:
     For each row (A)
       Find closest vertex (B)
       Compute distance from node to vertex
       Find other end of segment with closest vertex (C) as endpoint and compute sidedness against closest segment
       Compute sidedness of node against segment (left Right)
       Increment down column, and, if node is determinate, add to count on this side If node is marked with mask, compute sidedness. If on opposite side from previous, then start accumulating in opposite bin (accumulate count, and accumulate z-value of grid node for left and right)

Determine major fault a) Determine if one fault is "much" bigger than the other fault. Determined by statistical analysis of multiple data scenarios, a multiple of two (2) was used. That is, if the total determinate node count for fault F1>2 * the total determinate node count for fault F2 (F1>2 * F2), then, fault F1 is the major fault. But, if F2>2 * F1, then, F2 is the major fault.

b) If (a) above fails, then, if: In1min=minimum of left/right accumulations for F1=0, and, In2min minimum of left/right accumulations for F2=0, then, "major" is undefined.

c) If (a) and (b) above fail, then, if: In1min=0, and In2min is significant (i.e. In2min/In2max>0.9), determined by statistical observation, then, F2 is major, else, major is undefined. If In2min=0 and In1min is significant (i.e., In1min/In2max>0.9), then, F1 is major, else major is undefined.

d) If (a), (b), and (c) above fail, then, if (In1max/In1min)>(In2max/In2min) which implies F2 is split more evenly then F1, then, F2 is major, else F1 is major.

Determine relationship of minor Fault to major Fault a) compute relationship of left/right to above/below:

If left of minor has more determinate nodes than right of minor, then:

For each segment (x1, y1)–(x2, y2) in F1t-F1t intersection line, let:

dx=x2−x1,
dy=y2−y1,
dr=sqrt (dxx+dyy),
coordmax=max(x1, y1, x2, y2),
drEps=system epsilon,
dxEps=drEps*dx/dr, and
dyEps=drEps*dy/dr;

Offset each vertex by (−10*dyEps) in X and (+10*dxEps) in Y,

If (right), then offset by (+10*dyEps) in X and (−10*dxEps) in Y.

If "above" bin total>"below" bin total, then, left=above.

If right="above" and ztyp=(neg. subsea) elevation, then, relationship=truncate "below"

If right="above" and ztyp=depth (+subsea), then relationship=truncate "above"

If right="below" and ztyp=elevation, then relationship=truncate "above"

If right="below" and ztyp=depth, then relationship=truncate "below"

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. Apparatus adapted to be disposed in a workstation and responsive to a plurality of seismic data containing information representative of a plurality of faults in an earth formation for determining geologic relationships for intersecting ones of said plurality of faults, comprising:

first means for determining if a pair of faults of said plurality of faults relate;

second means for determining which fault of said pair of faults is a major fault and which fault of said pair of faults is a minor fault; and third means for determining if the minor fault intersects the major fault from above or below the major fault, the minor fault being truncated below the major fault when the minor fault intersects the major fault from above the major fault, the minor fault being truncated above the major fault when the minor fault intersects the major fault from below the major fault.

2. The apparatus of claim 1, wherein said first means, for determining if said pair of faults relate, comprises:

means for placing a bounding box around each fault of said pair of faults and determining if the bounding boxes around said pair of faults intersect, wherein said pair of faults do not relate when said bounding boxes around said pair of faults do not intersect.

3. The apparatus of claim 2, wherein a first fault of said pair of faults includes a first plurality of determinate nodes and a second fault of said pair of faults includes a second plurality of determinate nodes, and wherein said first means further comprises:

means for subtracting corresponding ones of said plurality of determinate nodes of said first fault from corresponding ones of said plurality of determinate nodes of said second fault thereby producing one or more zero value coordinates, said pair of faults relating when said one or more zero value coordinates are produced in response to the subtraction performed by said means for subtracting.

4. The apparatus of claim 3, wherein said first means further comprises:

means for determining a fault fault intersection line representing an intersection between said first fault of said pair of faults and said second fault of said pair of faults, said fault fault intersection line including said corresponding ones of said plurality of determinate nodes of said first fault and said corresponding ones of said plurality of determinate nodes of said second fault.

5. The apparatus of claim 1, wherein a first fault of said pair of faults includes a first plurality of determinate nodes and a second fault of said pair of faults includes a second plurality of determinate nodes, and wherein said second means, for determining which fault of said pair of faults is a major fault and which fault of said pair of faults is a minor fault, comprises:

means for determining if the number of said determinate nodes of said first fault of said pair of faults is greater than the number of said determinate nodes of said second fault of said pair of faults, said first fault of said pair of faults being said major fault and said second fault of said pair of faults being said minor fault when the number of said determinate nodes of said first fault is greater than the number of said determinate nodes of said second fault.

6. The apparatus of claim 1, wherein a first fault of said pair of faults includes a first aerial extent and a second fault of said pair of faults includes a second aerial extent, and wherein said second means, for determining which fault of said pair of faults is a major fault and which fault of said pair of faults is a minor fault, comprises;

means for determining if the aerial extent of said first fault of said pair of faults is greater than two times the aerial extent of said second fault of said pair of faults, said first fault of said pair of faults being said major fault and said second fault of said pair of faults being said minor fault when the aerial extent of said first fault of said pair of faults is greater than two times the aerial extent of said second fault of said pair of faults.

7. The apparatus of claim 1, wherein:
a first fault of said pair of faults intersects a second fault of said pair of faults along a fault fault intersection line,
said first fault includes a first number of determinate nodes (F1T) on one side of said intersection line and a second number of determinate nodes (F1B) on the other side of said intersection line,
said second fault includes a third number of determinate nodes (F2T) on one side of said intersection line and a fourth number of said determinate nodes (F2B) on the other side of said intersection line.

8. The apparatus of claim 7, wherein said second means, for determining which fault of said pair of faults is a major fault and which fault of said pair of faults is a minor fault, comprises means for determining if the following first relation is true:

Min(F1T, F1B)/Max(F2T, F2B)>0.9, said first fault being said major fault and said second fault being said minor fault when said first relation is true.

9. The apparatus of claim 7, wherein said second means, for determining which fault of said pair of faults is a major fault and which fault of said pair of faults is a minor fault, comprises means for determining if the following first relation is true:

Max(F1T, F1B)/Min(F1T, F1B)<Max(F2T, F2B)/Min(F2T, F2B), said first fault being said major fault and said second fault being said minor fault when said first relation is true.

10. The apparatus of claim 7, wherein said second means, for determining which fault of said pair of faults is a major fault and which fault of said pair of faults is a minor fault, comprises means for determining if the following first relation is true:

Min(F2T, F2B)/Max(F2T, F2B)>0.9, said second fault being said major fault and said first fault being said minor fault when said first relation is true.

11. The apparatus of claim 7, wherein said second means, for determining which fault of said pair of faults is a major fault and which fault of said pair of faults is a minor fault, comprises means for determining if the following first relation is true:

Max(F1T, F1B)/Min(F1T, F1B)>Max(F2T, F2B)/Min(F2T, F2B), said second fault being said major fault and said first fault being said minor fault when said first relation is true.

12. A method, adapted to be practiced by an apparatus adapted to be disposed in a workstation which is responsive to a plurality of seismic data containing information representative of a plurality of faults in an earth formation, for determining geologic relationships for intersecting ones of said plurality of faults, comprising the steps of:
(a) determining if a pair of faults of said plurality of faults relate;
(b) determining which fault of said pair of faults is a major fault and which fault of said pair of faults is a minor fault when said pair of faults are determined to relate in response to the determining step (a); and
(c) determining if the minor fault intersects the major fault from above or below the major fault when said major fault and said minor fault of said pair of faults is identified in response to the determining step (b),
the minor fault being truncated below the major fault when the minor fault intersects the major fault from above the major fault, the minor fault being truncated above the major fault when the minor fault intersects the major fault from below the major fault.

13. The method of claim 12, wherein the determining step (a), for determining if said pair of faults relate, comprises the steps of:
(a1) placing a bounding box around each fault of said pair of faults and determining if the bounding boxes around said pair of faults intersect,
wherein said pair of faults do not relate when said bounding boxes around said pair of faults do not intersect.

14. The method of claim 13, wherein a first fault of said pair of faults includes a first plurality of determinate nodes and a second fault of said pair of faults includes a second plurality of determinate nodes, and wherein the determining step (a) further comprises the step of:
(a2) subtracting corresponding ones of said plurality of determinate nodes of said first fault from corresponding ones of said plurality of determinate nodes of said second fault thereby producing one or more zero value coordinates,
said pair of faults relating when said one or more zero value coordinates are produced in response to the subtraction performed during the subtracting step (a2).

15. The method of claim 14, wherein the determining step (a) further comprises the step of:
(a3) determining a fault fault intersection line representing an intersection between said first fault of said pair of faults and said second fault of said pair of faults,
said fault fault intersection line including said corresponding ones of said plurality of determinate nodes of said first fault and said corresponding ones of said plurality of determinate nodes of said second fault.

16. The method of claim 12, wherein a first fault of said pair of faults includes a first plurality of determinate nodes and a second fault of said pair of faults includes a second plurality of determinate nodes, and wherein the determining step (b), for determining which fault of said pair of faults is a major fault and which fault of said pair of faults is a minor fault, comprises the steps of:
(b1) determining if the first number of said determinate nodes of said first fault of said pair of faults is greater than the second number of said determinate nodes of said second fault of said pair of faults,
said first fault of said pair of faults being said major fault and said second fault of said pair of faults being said minor fault when the first number of said determinate nodes of said first fault is greater than the second number of said determinate nodes of said second fault.

17. The method of claim 12, wherein a first fault of said pair of faults includes a first aerial extent and a second fault of said pair of faults includes a second aerial extent, and wherein the determining step (b), for determining which fault of said pair of faults is a major fault and which fault of said pair of faults is a minor fault, comprises the steps of;
(b1) determining if the aerial extent of said first fault of said pair of faults is greater than two times the aerial extent of said second fault of said pair of faults,
said first fault of said pair of faults being said major fault and said second fault of said pair of faults being said minor fault when the aerial extent of said first fault of said pair of faults is greater than two times the aerial extent of said second fault of said pair of faults.

18. The method of claim 12, wherein:
a first fault of said pair of faults intersects a second fault of said pair of faults along a fault fault intersection line,
said first fault includes a first number of determinate nodes (F1T) on one side of said intersection line and a second number of determinate nodes (F1B) on the other side of said intersection line,
said second fault includes a third number of determinate nodes (F2T) on one side of said intersection line and a fourth number of said determinate nodes (F2B) on the other side of said intersection line.

19. The method of claim 18, wherein the determining step (b), for determining which fault of said pair of faults is a major fault and which fault of said pair of faults is a minor fault, comprises the step of:
(b1) determining if the following first relation is true:

Min(F1T, F1B)/Max(F2T, F2B)>0.9, said first fault being said major fault and said second fault being said minor fault when said first relation is true.

20. The method of claim 18, wherein the determining step (b), for determining which fault of said pair of faults is a major fault and which fault of said pair of faults is a minor fault, comprises the step of:
(b1) determining if the following first relation is true:

Max(F1T, F1B)/Min(F1T, F1B)<Max(F2T, F2B)/Min(F2T, F2B), said first fault being said major fault and said second fault being said minor fault when said first relation is true.

21. The method of claim 18, wherein the determining step (b), for determining which fault of said pair of faults is a major fault and which fault of said pair of faults is a minor fault, comprises the step of:
(b1) determining if the following first relation is true:

Min(F2T, F2B)/Max(F2T, F2B)>0.9, said second fault being said major fault and said first fault being said minor fault when said first relation is true.

22. The method of claim 18, wherein the determining step (b), for determining which fault of said pair of faults is a major fault and which fault of said pair of faults is a minor fault, comprises the step of:
(b1) determining if the following first relation is true:

Max(F1T, F1B)/Min(F1T, F1B)>Max(F2T, F2B)/Min(F2T, F2B), said second fault being said major fault and said first fault being said minor fault when said first relation is true.

23. A device, comprising:
storage means for storing instructions, said instructions being executable by a processor of a workstation when said instructions stored in said storage means are loaded into said workstation, said workstation being responsive to a plurality of seismic data containing information representative of a plurality of faults in an earth formation, said instructions, when loaded into said workstation and executed by said processor, conducting a process for determining geologic relationships for intersecting ones of said plurality of faults, comprising the steps of:

(a) determining if a pair of faults of said plurality of faults relate;
(b) determining which fault of said pair of faults is a major fault and which fault of said pair of faults is a minor fault when said pair of faults are determined to relate in response to the determining step (a); and
(c) determining if the minor fault intersects the major fault from above or below the major fault when said major fault and said minor fault of said pair of faults is identified in response to the determining step (b),
the minor fault being truncated below the major fault when the minor fault intersects the major fault from above the major fault, the minor fault being truncated above the major fault when the minor fault intersects the major fault from below the major fault.

24. The device of claim 23, wherein the determining step (a), for determining if said pair of faults relate, comprises the steps of:
(a1) placing a bounding box around each fault of said pair of faults and determining if the bounding boxes around said pair of faults intersect,
wherein said pair of faults do not relate when said bounding boxes around said pair of faults do not intersect.

25. The device of claim 24, wherein a first fault of said pair of faults includes a first plurality of determinate nodes and a second fault of said pair of faults includes a second plurality of determinate nodes, and wherein the determining step (a) further comprises the step of:
(a2) subtracting corresponding ones of said plurality of determinate nodes of said first fault from corresponding ones of said plurality of determinate nodes of said second fault thereby producing one or more zero value coordinates,
said pair of faults relating when said one or more zero value coordinates are produced in response to the subtraction performed during the subtracting step (a2).

26. The device of claim 25, wherein the determining step (a) further comprises the step of:
(a3) determining a fault fault intersection line representing an intersection between said first fault of said pair of faults and said second fault of said pair of faults,
said fault fault intersection line including said corresponding ones of said plurality of determinate nodes of said first fault and said corresponding ones of said plurality of determinate nodes of said second fault.

27. The device of claim 23, wherein a first fault of said pair of faults includes a first plurality of determinate nodes and a second fault of said pair of faults includes a second plurality of determinate nodes, and wherein the determining step (b), for determining which fault of said pair of faults is a major fault and which fault of said pair of faults is a minor fault, comprises the steps of:
(b1) determining if the first number of said determinate nodes of said first fault of said pair of faults is greater than the second number of said determinate nodes of said second fault of said pair of faults,
said first fault of said pair of faults being said major fault and said second fault of said pair of faults being said minor fault when the first number of said determinate nodes of said first fault is greater than the second number of said determinate nodes of said second fault.

28. The device of claim 23, wherein a first fault of said pair of faults includes a first aerial extent and a second fault of said pair of faults includes a second aerial extent, and wherein the determining step (b), for determining which fault of said pair of faults is a major fault and which fault of said pair of faults is a minor fault, comprises the steps of;

(b1) determining if the aerial extent of said first fault of said pair of faults is greater than two times the aerial extent of said second fault of said pair of faults, said first fault of said pair of faults being said major fault and said second fault of said pair of faults being said minor fault when the aerial extent of said first fault of said pair of faults is greater than two times the aerial extent of said second fault of said pair of faults.

29. The device of claim 23, wherein:

a first fault of said pair of faults intersects a second fault of said pair of faults along a fault fault intersection line, said first fault includes a first number of determinate nodes (F1T) on one side of said intersection line and a second number of determinate nodes (F1B) on the other side of said intersection line, said second fault includes a third number of determinate nodes (F2T) on one side of said intersection line and a fourth number of determinate nodes (F2B) on the other side of said intersection line.

30. The device of claim 29, wherein the determining step (b), for determining which fault of said pair of faults is a major fault and which fault of said pair of faults is a minor fault, comprises the step of:

(b1) determining if the following first relation is true:

$$\text{Min}(F1T, F1B)/\text{Max}(F2T, F2B) > 0.9,$$

said first fault being said major fault and said second fault being said minor fault when said first relation is true.

31. The device of claim 29, wherein the determining step (b), for determining which fault of said pair of faults is a major fault and which fault of said pair of faults is a minor fault, comprises the step of:

(b1) determining if the following first relation is true:

$$\text{Max}(F1T, F1B)/\text{Min}(F1T, F1B) < \text{Max}(F2T, F2B)/\text{Min}(F2T, F2B),$$

said first fault being said major fault and said second fault being said minor fault when said first relation is true.

32. The device of claim 29, wherein the determining step (b), for determining which fault of said pair of faults is a major fault and which fault of said pair of faults is a minor fault, comprises the step of:

(b1) determining if the following first relation is true:

$$\text{Min}(F2T, F2B)/\text{Max}(F2T, F2B) > 0.9,$$

said second fault being said major fault and said first fault being said minor fault when said first relation is true.

33. The device of claim 29, wherein the determining step (b), for determining which fault of said pair of faults is a major fault and which fault of said pair of faults is a minor fault, comprises the step of:

(b1) determining if the following first relation is true:

$$\text{Max}(F1T, F1B)/\text{Min}(F1T, F1B) > \text{Max}(F2T, F2B)/\text{Min}(F2T, F2B),$$

said second fault being said major fault and said first fault being said minor fault when said first relation is true.

* * * * *